(12) United States Patent
Marcu et al.

(10) Patent No.: US 7,777,760 B2
(45) Date of Patent: Aug. 17, 2010

(54) DISPLAY COLOR CORRECTING SYSTEM

(75) Inventors: Gabriel G. Marcu, San Jose, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 566 days.

(21) Appl. No.: 11/771,955

(22) Filed: Jun. 29, 2007

(65) Prior Publication Data
US 2009/0002785 A1 Jan. 1, 2009

(51) Int. Cl.
G09G 5/02 (2006.01)
G09G 5/00 (2006.01)
H04N 5/46 (2006.01)
H04N 1/60 (2006.01)
G03F 3/08 (2006.01)
G06T 15/20 (2006.01)
G06K 9/34 (2006.01)

(52) U.S. Cl. ........................ 345/601; 345/589; 345/592; 345/606; 345/586; 348/557; 348/488; 348/599; 358/504; 358/518; 358/523; 358/525; 382/162; 382/167; 382/274; 382/300

(58) Field of Classification Search ......... 345/589–593, 345/581, 586, 597, 600–602, 603–604, 606, 345/618; 358/515–525, 1.9, 504; 348/469, 348/488, 538–539, 557, 577, 578, 582, 599, 348/612, 671–675; 382/162, 167, 254, 274, 382/276, 300
See application file for complete search history.

(56) References Cited

U.S. PATENT DOCUMENTS

| 4,275,413 A | 6/1981 | Sakamoto et al. |
| 4,477,833 A | 10/1984 | Clark et al. |
| 2007/0247648 A1* | 10/2007 | Brito et al. .................. 358/1.9 |

* cited by examiner

Primary Examiner—Wesner Sajous
(74) Attorney, Agent, or Firm—Morrison & Foerster LLP

(57) ABSTRACT

A display color-correcting system is provided. Color response values are measured that go into the vertices of polyhedra in a cubic color output space of the display. A set of corresponding values for the display is built from intermediate values determined between the measured color response values. The intermediate values are determined by decomposition and interpolation of interpolation volumes in the cubic color output space. Each of the interpolation volumes is the combined volume of a selected polyhedron within the cubic color output space and a predetermined volume of space between the selected polyhedron and the next polyhedron within the cubic color output space. The set of corresponding values is converted into decoupled RGB adjustment values that specify the RGB signals independently for the display to produce corrected colors. The RGB adjustment values are saved into one or more look-up tables.

86 Claims, 14 Drawing Sheets

DISPLAY COLOR CORRECTING SYSTEM

TECHNICAL FIELD

The present invention relates generally to display devices, and more particularly to a system for color correcting a display for gray tracking.

BACKGROUND ART

With the advance of display systems illumination technology from incandescent to fluorescent to solid-state light sources, and with ever-increasing miniaturization, one popular electronic category seems not to have kept pace. That category is large-sized personal data displays, such as personal computer monitors.

For many years, such monitors were based on cathode ray tube ("CRT") technology. More recently, flat panel displays have increasingly displaced CRT displays. The most common form of flat panel displays utilizes one or more fluorescent light sources located behind a liquid crystal display ("LCD") screen. Contemporary technology has enabled the use of cold cathode fluorescent light ("CCFL") light sources, but because a cathode emitter is still required, a high voltage source for striking and maintaining an electric arc through the CCFL is also required.

With continuing improvements in light-emitting diode ("LED") technology, such as substantial improvements in brightness, energy efficiency, color range, life expectancy, durability, robustness, and continual reductions in cost, LEDs have increasingly been of interest for superseding CCFLs in larger computer displays. Indeed, LEDs have already been widely adopted as the preferred light source in smaller display devices, such as those found on portable cellular telephones, personal data assistants ("PDAs"), personal music devices (such as Apple Inc.'s iPod®), and so forth.

One reason for preferring LED light sources to CCFL backlight light sources is the substantially larger color gamma that can be provided by LED light sources. Typically, an LCD display that is illuminated by a CCFL backlight produces about 72-74 percent of the color gamma of a CRT-based NTSC display. ("NTSC" is the analog television system in use in Canada, Japan, South Korea, the Philippines, the United States, and some other countries.) Current LED backlight display technology, however, has the potential of producing 104-118 percent or more of that gamma color space.

Another reason for not preferring CCFL bulbs is that they contain environmentally unfriendly mercury, which could be advantageously eliminated if an acceptable LED backlight light source configuration could be developed for larger displays.

When implemented in small displays such as just described, the technical requirements are readily met. As is known in the art, the illumination intensity can be rendered uniform by distributing LED light sources around the periphery of the display and utilizing light diffusing layers behind the display to equalize the display intensity. The technical challenges are modest because the screens are modest in size, so that the individual display pixels are never very far from one or more of the LED light sources. Light attenuation caused by distance from the LED light sources is therefore not great and is readily equalized by appropriate LED positioning coupled with suitable light diffusers behind the display.

One way to envision the ease with which this challenge can be met in smaller displays is to consider the number of pixels, on average, that each LED light source must support in the display, and the maximum distances per pixel that the most distant pixels are located relative to a given LED light source. These numbers are modest (perhaps in the hundreds), so the light diminution or attenuation for the most distant pixels is similarly modest and readily compensated by suitable diffuser designs.

On the other hand, the larger geometries of typical flat panel computer monitors and displays (e.g., larger than about 20 inches) create area-to-perimeter ratios that have proven untenable for current LED technologies, particularly with respect to LED brightness or light output. This has meant that it has proven unsatisfactory to attempt to replace CCFL light sources with LED light sources along one or more edges of such larger display screens. Accordingly, such displays continue to employ CCFL light sources even though CCFL light sources are increasingly less desirable than LED light sources.

It would seem that a straightforward solution for replacing CCFL light sources with LEDs would then be to arrange the LEDs in some sort of array configuration behind the LCD display screen, rather than around the perimeter. Prior attempts to do so, however, have proven unsatisfactory. Commercially viable displays for general consumption must be economical to manufacture, thin, lightweight, must provide efficient thermal management capability, and must provide consistent and uniform color quality and brightness throughout the display, all at reasonable costs. Attempts to meet these criteria in acceptable form factors and costs have been unsuccessful.

Previous efforts to achieve these objectives have failed due to a number of practical obstacles. For example, even though LED light outputs have dramatically improved in recent years, a very large number of LEDs is still required to provide sufficient brightness in such larger displays. Typically, a minimum of several hundred LEDs must be used. This then requires an enormously large maze of wires and/or bulky circuit boards to mount, support, and power such a large number of LEDs in a distributed matrix configuration. This in turn requires adequate mechanical structure to support all those components behind the LED screen. The resulting structure is bulky, thick, heavy, and not well suited for managing and removing the heat that is generated by the LEDs and the underlying electrical circuitry. It is also expensive and not well suited for efficient manufacturing.

Another challenge with utilizing LEDs in large arrays is maintaining uniformity of color in the large numbers of LEDs. The color balance and spectra of the LEDs is limited by the phosphorescence. For example, white LEDs are often actually blue LEDs with a complementary phosphor dot on the front of the LED. Depending upon manufacturing precision (and thus, related manufacturing costs), actual colors may vary from, for example, slightly blue to slightly pink. Understandably, reducing or compensating for such variability increases cost and complexity significantly as the number of LEDs increases in larger display configurations and environments.

The color and the output of each LED also depend fairly sensitively on temperature. The difficulties in providing proper thermal management capability can readily lead to temperature variations across the distributed array of LED light sources. Since the color qualities of LED light sources are sensitively dependent upon their operating temperatures, such non-uniformities lead to unacceptable variations in color from one portion of the display to another.

Another major obstacle to commercialization of such larger LED light source displays is the complexity and costs associated with measuring and calibrating each such display as it is being manufactured. Prior CCFL displays commonly use one, or at most just a few, CCFL light sources, so the necessary calibrations and corrections, such as color correction and gamma correction, can be easily accomplished and managed. For example, a single CCFL light source will provide uniform and homogeneous color and gamma for the entire display, so localized corrections are not usually a concern. The need for highly customized color corrections for individual displays has also been basically eliminated due to quality control advances in CCFL light source technology that has led to economical production of CCFL light sources that consistently provide reliably uniform illumination profiles.

Such is not the case with LED light source displays that include multiple LED light sources distributed at various display locations. When employed in larger displays, as previously described, the LEDs may be distributed throughout the area behind the display, and not just along the perimeter edges. This results in possible performance variations that can result from any number of causes, for example, temperature variations from one region of the display to another.

Calibration of a display may be accomplished by adjusting the imaging layer, such as a display's thin film transistor liquid crystal display ("TFT-LCD"). Calibration of the TFT-LCD to compensate for LED variability can be complex due, among other reasons, to the properties of the TFT-LCD itself. For example, there can be cross talk between color channels due to interaction properties of the LCD elements. Other calibration adjustments may be required due to non-linearities of output with brightness, asymmetrical RGB ("red, green, and blue") transfer functions for the color channels, differing gamma profiles, proper and accurate gray tracking, and so forth.

As a result, it has been important to measure and calibrate each LED light source display to establish profiles for each such display that enable compensations to be made for those intrinsic factors. Compensations can be made, for example, by appropriately changing the image renditions formed by the TFT-LCD panel of the display to reverse and neutralize the LED performance variations. The compensations can be managed, for example, by the device that controls the display (e.g., a computer) or by suitable circuitry within the display itself. However, each display must first be appropriately measured and carefully calibrated. Heretofore this has been a time-consuming and expensive process, acceptable perhaps for limited-production, "high-end" specialty displays, but not acceptable for mass-produced consumer products.

As a result, prior efforts to replace CCFL light sources with LEDs in commercial consumer applications have largely failed to move beyond the prototype stage. The complexities, manufacturing costs, bulkiness, very heavy weights, color non-uniformities, thermal management challenges, calibration complexities and costs, and so forth, have simply combined in such a way as to leave experts in the technology convinced that they must yet await the development of even significantly brighter, more uniform, and less expensive LEDs.

Consumers expect and demand an excellent, consistent, and affordable consumer experience. Prior attempts to utilize LEDs in large displays have thus not solved the problem of building displays that are light, easy and inexpensive to manufacture, uniform in color, low in cost, and that also provide the excellent overall high quality user experience that customers demand and expect.

Thus, a need still remains for improved display color-correcting systems, and especially for improved gray tracking that is provided efficiently, effectively, and economically, with reduced measurement sets. In view of the ever-increasing commercial competitive pressures, along with growing consumer expectations, and the diminishing opportunities for meaningful product differentiation in the marketplace, it is critical that answers be found for these problems. Additionally, the need to save costs, improve production and product efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a display color-correcting system. Color response values are measured that go into the vertices of polyhedra in a cubic color output space of the display. A set of corresponding values for the display is built from intermediate values determined between the measured color response values. The intermediate values are determined by decomposition and interpolation of interpolation volumes in the cubic color output space. Each of the interpolation volumes is the combined volume of a selected polyhedron within the cubic color output space and a predetermined volume of space between the selected polyhedron and the next polyhedron within the cubic color output space. The set of corresponding values is converted into decoupled RGB adjustment values that specify the RGB signals independently for the display to produce corrected colors. The RGB adjustment values are saved into one or more look-up tables.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
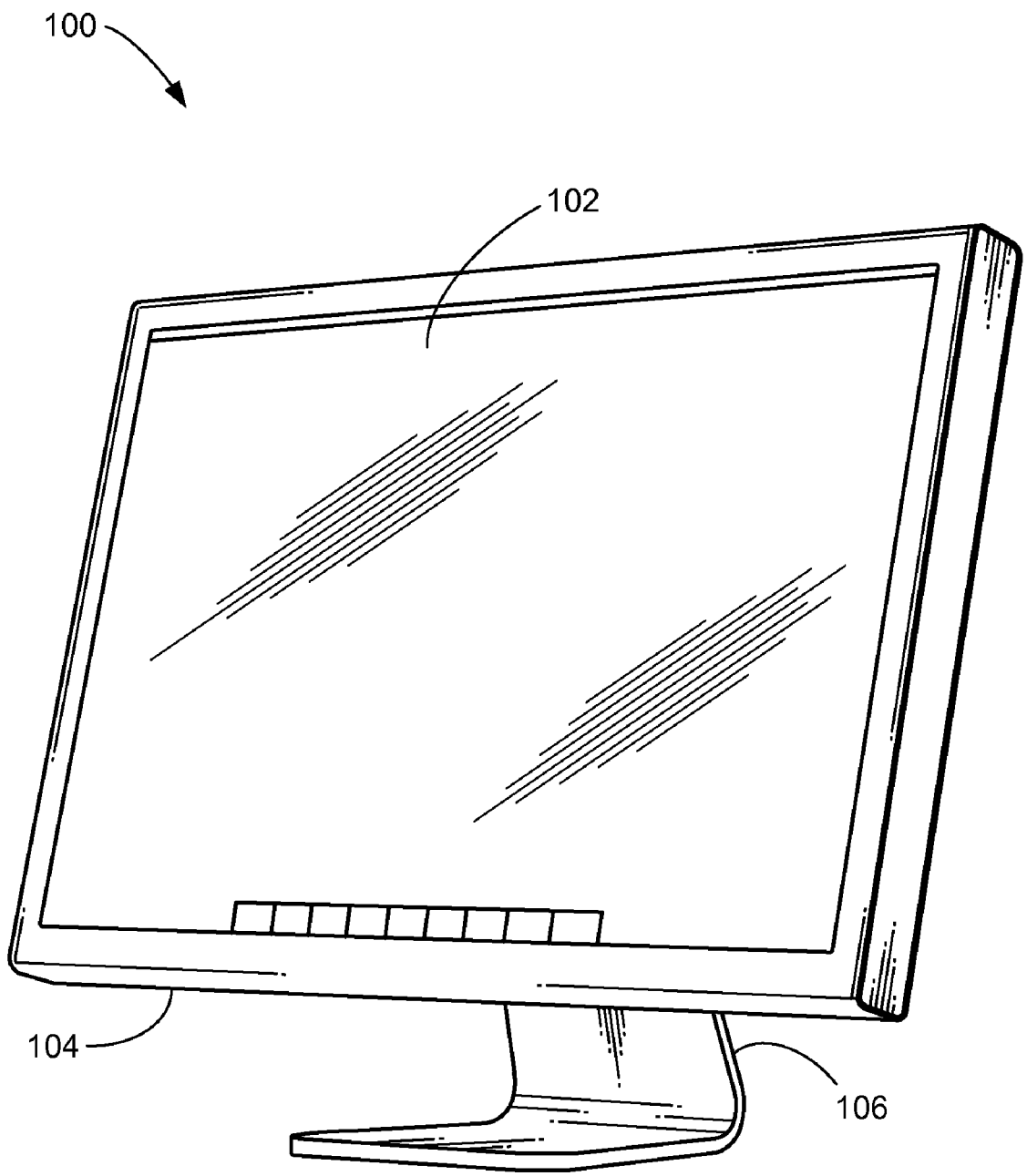
FIG. 1 is a view of a display system having a display assembly in accordance with the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Similarly, the drawings showing embodiments of the system are semi-diagrammatic and not to scale and, particularly, some of the dimensions are for the clarity of presentation and are exaggerated in the drawing FIGs. Likewise, although the views in the drawings for ease of description generally show similar orientations, this depiction in the FIGs. is arbitrary for the most part. Generally, the invention can be considered, understood, and operated in any orientation.

In addition, where multiple embodiments are disclosed and described having some features in common, for clarity and ease of illustration, description, and comprehension thereof, similar and like features one to another will ordinarily be described with like reference numerals.

For expository purposes, terms, such as "above", "below", "bottom", "top", "side" (as in "sidewall"), "higher", "lower", "upper", "over", and "under", are defined with respect to the back of the display device except where the context indicates a different sense. The term "on" means that there is direct contact among elements.

The term "system" as used herein refers to and is defined as the method and as the apparatus of the present invention in accordance with the context in which the term is used.

As used herein, the terms "tile" and "tile LED light source" are defined, according to the context in which used, to mean an assembly, formed integrally on a thermally conductive substrate, with at least two similar or substantially matching LED light sources physically mounted and electrically connected thereon and configured for emitting light therefrom, and that has fewer than the total number of LED light sources utilized by the display system into which the tile is incorporated. When used with the term "tile", the term "thermally conductive" is defined to mean having thermal conduction properties comparable to or better than those of metal.

Referring now more specifically to the present invention, there are considerable concerns that arise from the use of light-emitting diodes ("LEDs") rather than cathode ray tubes ("CRTs") or cold cathode fluorescent lights ("CCFLs"). One area of concern is color uniformity and color output compensation. LEDs present unique color management challenges unlike those of earlier light source technologies, because LEDs can require finer and more complex compensations over larger color ranges. Providing such greater control can be difficult in modern flat screen displays, and can require very large numbers of calibration measurements.

For example, color liquid crystal display ("LCD") screens have complicated interactions and behaviors, such as channel cross-talk and non-linear response characteristics, that cause complex unequal color channel responses. LCDs accordingly require more complex and sophisticated control and compensation to provide true color output that compensates for LED light source variabilities.

Consequently, in order to completely describe the display product, it is necessary to gather much more information about a display that uses LED light sources. This greater information then enables accurate tracking and matching of the color input signals for proper compensation, and assures fidelity to the video signals that are input into the display.

As a result, display system calibration can be complicated, time consuming, data intensive, and expensive, particularly for LED-driven large displays. While such a high measurement burden may be acceptable, perhaps even desirable, in high-end, high-priced, specialty displays, it is unacceptable and unreasonably expensive in a mass-production, consumer-oriented product configuration.

However, it is has been unexpectedly discovered, according to the teachings of the present invention, that it is possible to readily achieve the same desired characterization precision in a consumer-oriented product with only a small fraction of the characterization measurements heretofore required. This is achieved, as explained more particularly herein, by recognizing and exploiting certain determinable, underlying physical characteristics of the display system and its behavior, and by also exploiting certain characteristics of the human visual system.

With regard to the underlying physical characteristics of the display system, if all such characteristics were already known or predictable, it would not be necessary, of course, to calibrate the display. But calibration is needed because not all of the performance characteristics of the system (e.g., relative RGB color relationships, chromaticities, gamma profile variances, and so forth) are initially known. Non-linear system behaviors add to this complexity.

However, it has been unexpectedly discovered that some underlying physical characteristics of an unknown display system can be confidently predicted and exploited to increase the efficiency of the display system calibration, and to reduce the burden, size, and expense of such calibration. One such predictable characteristic is that the progression through the display values from black to white will be continuous and that there will be no discontinuities. It is therefore an assumption, implicit in the present invention, that adjacent values transition smoothly, and that unmeasured intermediate points will have values that follow smooth progressions between measured points, such that interpolated values between measured values will be acceptably accurate, particularly within small ranges.

With regard to the human visual system, the present invention exploits the particular increased sensitivity of the human eye to the quality of the color gray. (Gray, white, and black are understood and defined to be colors within the context of the present invention.) A "gray" that is slightly bluish or slightly pinkish will be readily noticed by a human observer. On the other hand, colors reproduced by the display system that are well away from gray, such as a bright green, a dark red, a medium yellow, and so forth, can have fairly significant errors from the original color and still be acceptable to, and in many cases unnoticed by, the human observer as long as the gray (neutral colors) are correctly reproduced.

The present invention thus enables the production of a highly effective and satisfactory display, suitable for commercial as well as consumer use, by producing a faithful reproduction of the range of gray hues from black to white. The gray hue values are determined by measurements at suitable points and accurately interpolated for all values of interest. With respect to colors other than gray, the need to maintain fidelity is efficiently relaxed progressively for colors that are more removed from gray.

In one embodiment, the present invention thus provides efficacious results by calibrating the red, green, and blue channels for the display to produce true gray values for all of the gray intensity levels from black to white. The calibrations for each of the color channels (i.e., red, green, and blue) for the display to produce corrected colors are then decoupled from each other and the compensatory RGB color corrections or adjustment values, that specify the RGB signals based upon the decoupled calibration values, are specified and made for each channel independently. The result is that when a signal is provided to the display calling for a gray rendition, each of the RGB channels will be correctly compensated for that gray signal level and a true gray will be rendered. On the other hand, an input signal calling for a yellow display output, for example, will apply the same respective compensations independently to the red channel and the green channel that the respective gray compensation would provide for the same respective individual gray brightness levels. The result may be that the yellow will not be quite as accurately reproduced as if the display had been calibrated for that off-gray shade of yellow. However, it has been unexpectedly discovered, as indicated, that such a discrepancy, if it appears, is in most cases minor, typically unnoticeable, and therefore acceptable to the human observer as long as the gray scale is correctly reproduced.

Referring now to FIG. 1, therein is shown a display system 100 having a display assembly 102 supported in a frame 104. In turn, the frame 104 is supported on a stand 106. The display system 100 has a distributed LED backlight (not shown, but see the backlight unit 220 in FIG. 2). As used herein, the term "backlight" is defined to mean a form of illumination that provides light for a display that illuminates the display from the back of the display. This definition means that the light is presented to the side of the display opposite the side of the display that is viewed, such that the light is shining through the display toward the viewer rather than reflecting toward the viewer from the front side of the display. As used herein, the term "distributed" is defined to mean that the LED light sources of the LED backlight are positioned across and within the area of the display assembly 102, and not just around the periphery thereof adjacent the front bezel (e.g., the front bezel 202 in FIG. 2).

Figure 2:
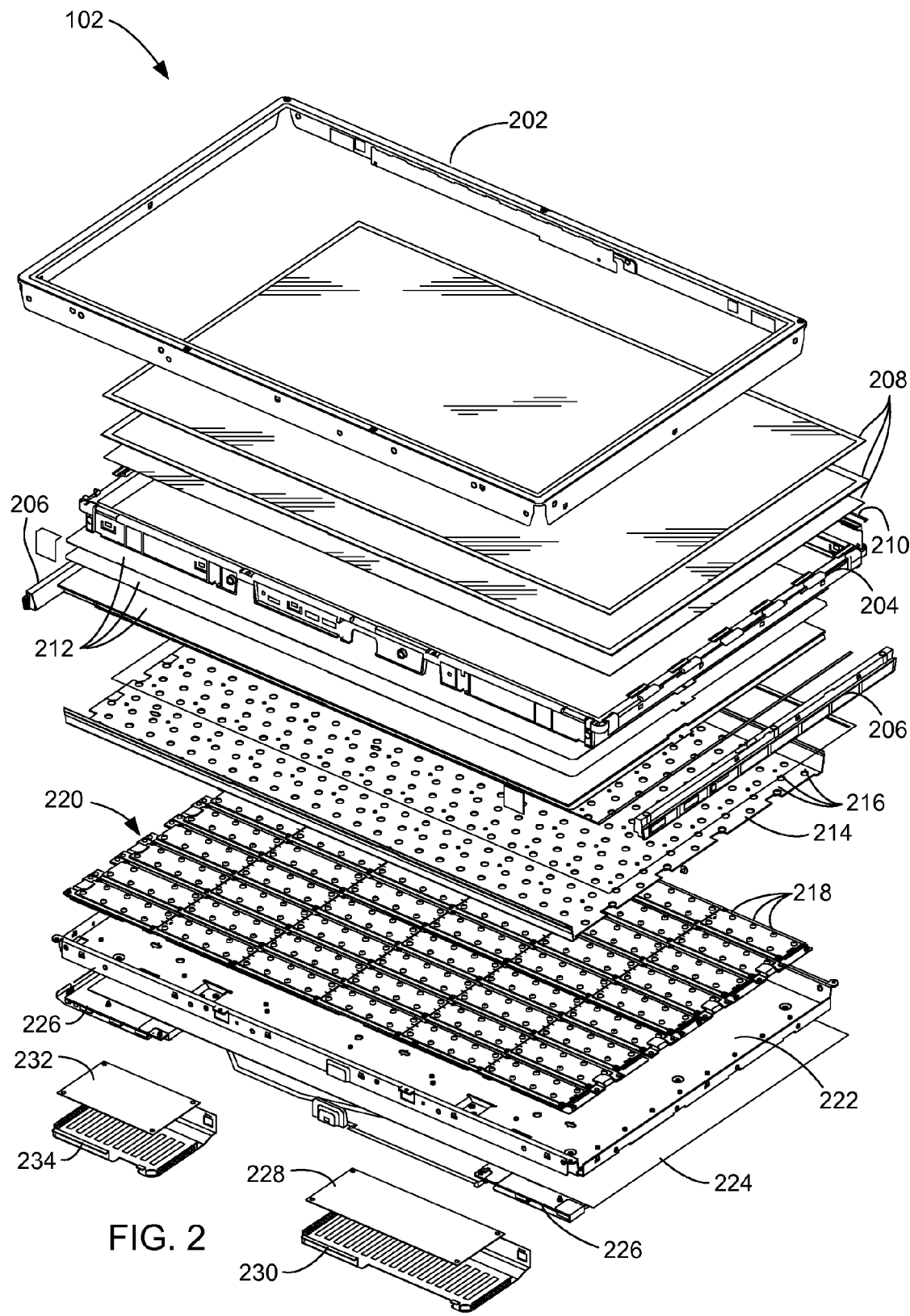
FIG. 2 is an exploded, isometric view of the majority of the major components of the display assembly in FIG. 1.

Referring now to FIG. 2, therein is shown an exploded, isometric view of the majority of the major components of the display assembly 102. The frame 104 (FIG. 1) includes a front bezel 202, a panel frame 204, and panel side rails 206.

The display assembly 102 also includes an LCD sub-assembly 208 that connects to LCD circuitry 210. In one embodiment, the LCD sub-assembly 208 utilizes thin film transistor ("TFT") technology to form a TFT LCD display, as is known in the art.

Beneath the LCD sub-assembly 208 are backlight diffuser sheets 212, beneath which is a reflector 214 having holes 216 therein that receive LEDs 218 on a backlight unit 220. The reflector 214 is thus positioned around the LEDs 218. The LEDs 218 are oriented forwardly toward the LCD sub-assembly 208 for illuminating the display assembly 102 from the back of the display.

The backlight unit 220 is physically and thermally attached to an array tray 222. A heat spreader 224, such as a graphite sheet, is attached to the back of the array tray 222 opposite the backlight unit 220 to conduct heat rapidly away therefrom and to equalize temperatures throughout the backlight unit 220. By connecting directly to the array tray 222 to which the backlight unit 220 is physically and thermally attached, the heat spreader 224 thermally integrates therewith, including with the tiles in the backlight unit 220.

Beneath the heat spreader 224 are two LED driver circuit boards 226, one on either side of the display assembly 102. Beneath one of the LED driver circuit boards 226, toward one side of the display assembly 102, is an LCD controller power control board 228 that is protected by an LCD controller shield 230 therebeneath. An LED power supply 232 is attached beneath the other LED driver circuit board 226 on the other side of the display assembly 102, opposite the LCD controller power control board 228. An LED power supply insulator 234 protects the LED power supply 232.

Figure 3:
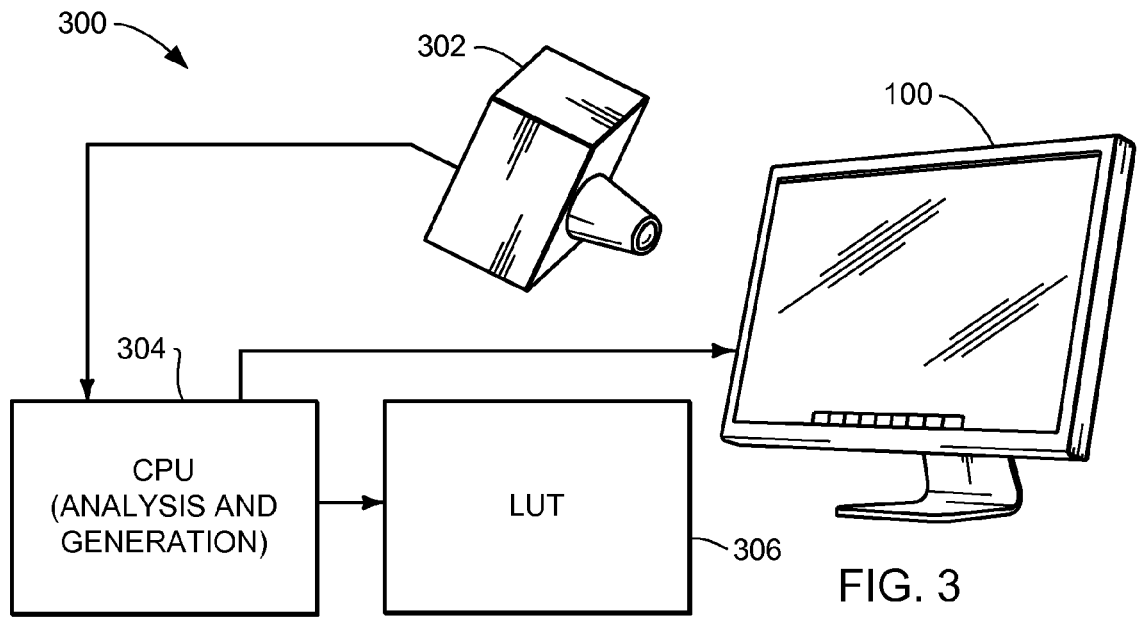
FIG. 3 is a view of a calibration system for calibrating a display in accordance with the present invention.

Referring now to FIG. 3, therein is shown a calibration system 300. The calibration system 300 includes a measurement unit 302 that is connected to and controlled by a central processing unit ("CPU") 304. The CPU 304 also controls the display system 100, sending test and calibration video display signals to the display system 100 and then querying the measurement unit 302 to determine what is actually displayed by the display system 100 in response to those video calibration signals. The actually measured color response display values are uncorrected RGB output data for the display and are identified by the CPU 304 as the color response values of the display system 100.

After the color response values of the display system 100 have been measured by the measurement unit 302 under the control of the CPU 304, the CPU 304 performs analysis of that color response value information and generates a look-up table ("LUT") 306 for later use by the display system 100.

As will be further explained below, the LUT 306 contains RGB adjustment values that result from the calibration of the display system 100, as described. The use of these adjustment values is understood by those skilled in the art. The adjustment values are used for color correction so that a standard color or image signal that is supplied to the display system 100 will be rendered more faithfully. For example, in certain ranges, a display system, such as the display system 100, might, due to its own particular characteristics, render certain colors somewhat off-color. The adjustment values in the LUT 306 provide for color correction so that the output colors displayed by the display system 100 more closely match the corresponding input color signals. Therefore, as used herein and understood by those of ordinary skill in the art, the term "corrected colors" for a display system is defined to mean output (displayed) colors with values that have been corrected in response to the measured color response values (e.g., as provided by the measurement unit 302 and the CPU 304).

In other words, the measured color response values are converted to RGB adjustment values that are then sent to and/or utilized by the display system 100 to produce and display the corrected colors. Input values for the display system 100 are thereby mapped into an output space that represents all the corrected color values. The information for making the color corrections is stored in and provided by the LUT 306.

Figure 4:
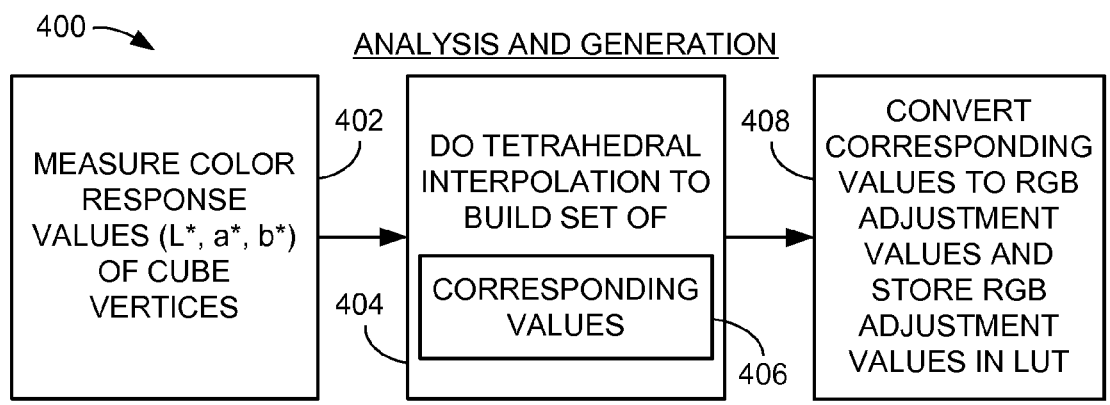
FIG. 4 is a flow diagram of the analysis and generation performed by the CPU in FIG. 3.

Referring now to FIG. 4, therein is shown a flow diagram 400 of the analysis and generation performed by the CPU 304 (FIG. 3). In a block 402, the color response values are measured. These values may be conveniently represented in well-known forms, such as, for example, (L*,a*,b*)$_i$ for each set of the red, green, and blue signal values (R,G,B)$_i$.

According to an embodiment of the present invention, these measurements are made at the vertices of cubes on the gray diagonal of a cubic color output space, as described further hereinbelow in connection with FIG. 7.

Following the block 402 (FIG. 4), tetrahedral interpolation is performed in a block 404 on the measured color response values of the cube vertices to build a set of corresponding values 406. Then, in a block 408, the corresponding values 406 are converted to RGB adjustment values, and the RGB adjustment values are stored in the LUT 306 (FIG. 3).

Figure 5:
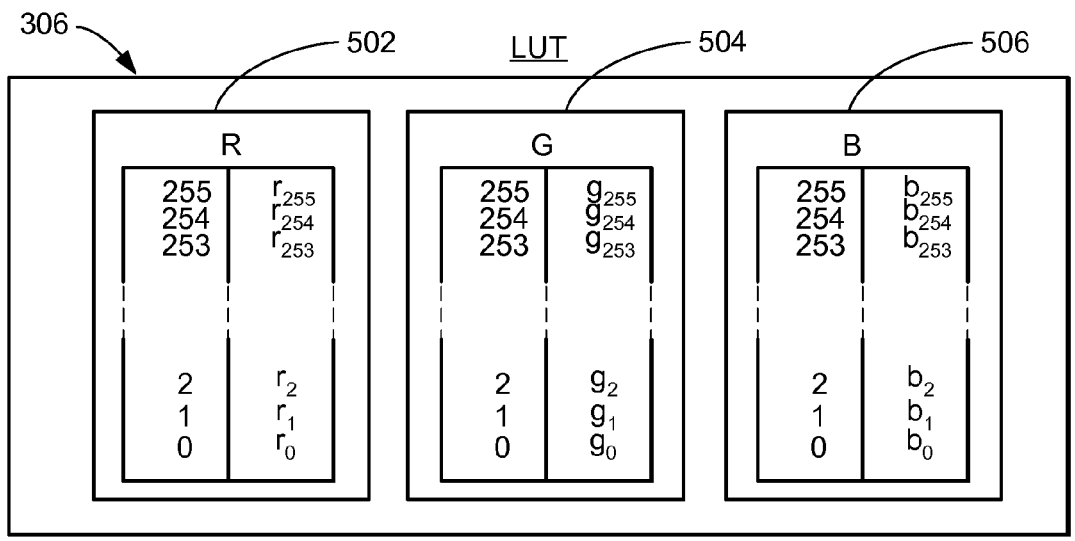
FIG. 5 is a depiction of the look-up table of FIG. 3 in accordance with an embodiment of the present invention.

Referring now to FIG. 5, therein is shown the LUT 306 in accordance with an embodiment of the present invention. The LUT 306 includes a LUT 502 for red values between 0 and 255, a LUT 504 for green values between 0 and 255, and a LUT 506 for blue values between 0 and 255. The LUTs 502, 504, and 506 are independent of each other and provide respective adjustment values for red, green, and blue independently for each red, green, and blue color.

Figure 6:
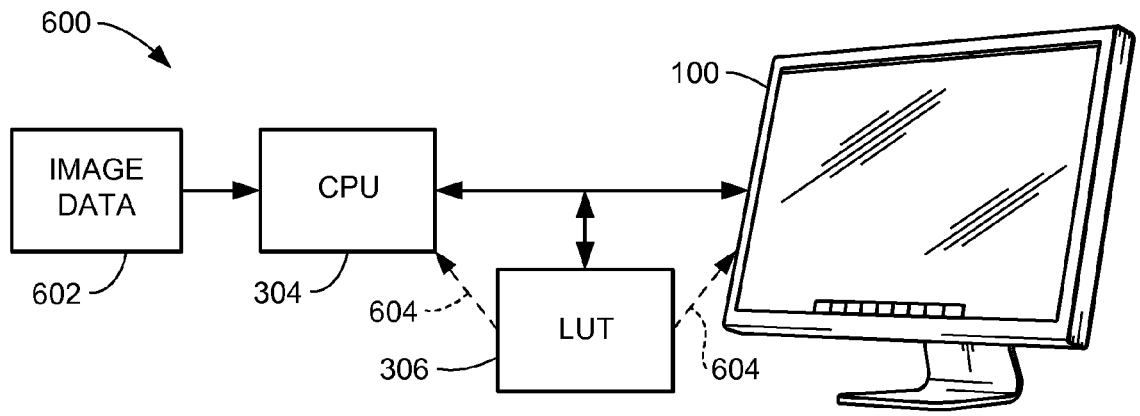
FIG. 6 is a block diagram depicting the operation of the display system of FIG. 1 utilizing the look-up table of FIG. 3 in accordance with the present invention.

Referring now to FIG. 6, therein is shown a block diagram 600 depicting the operation of the display system 100 utilizing the LUT 306 in accordance with the present invention. Image data 602 is provided to an image control unit, such as a CPU 304, which in turn provides a corrected video signal to the display system 100, as will be readily understood by those of ordinary skill in the art. The data utilized by the CPU 304 to correct the image data 602 is provided by the LUT 306. Dotted arrows 604 between the LUT 306, the CPU 304, and the display system 100, depict that the LUT 306 may be located in the display system 100, in the CPU 304, and/or externally from either the CPU 304 or the display system 100, as may be desired and appropriate for the particular configuration at hand.

Figure 7:
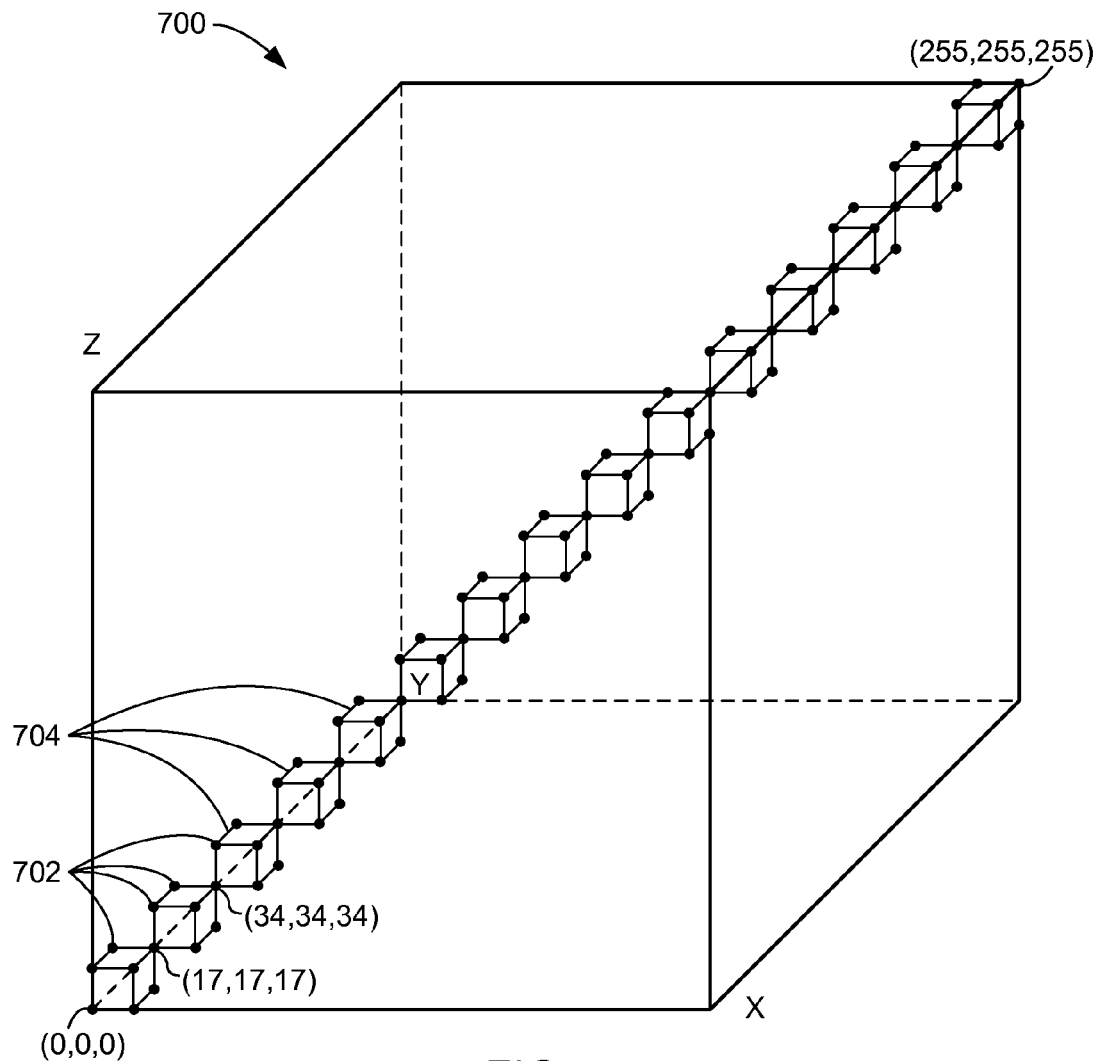
FIG. 7 is a view of a cubic color output space.

Referring now to FIG. 7, therein is shown a cubic color output space 700. In this example, the cubic color output space 700 is a cube dimensioned $2^8$ in each of the X, Y, and Z directions, representing red, green, and blue. While there are thus 256 increments represented for each RGB color value, it will be understood that the cubic color output space 700 may be incremented to any degree desired. It is also well understood that all possible colors are conventionally represented within the cubic color output space 700, beginning with black at the origin (0,0,0) and concluding with white at the vertex (255,255,255) opposite the origin.

To accurately provide color correction for the display system 100 (FIG. 6) for every point within the cubic color output space 700 would be a daunting task, requiring approximately $256^3$ adjustment value sets. Each adjustment value set would have three values for the respective RGB compensation (or adjustment) values for each such point. This is a well-recognized conundrum, and there are numerous solutions that are well known to those skilled in the art.

Many solutions utilize interpolation, whereby a reduced set of measurements is made within the cubic color output space 700. When omitted values are then needed, they are interpolated from the actually measured data values or points. Various known interpolation methods include linear interpolation, bi-linear interpolation, tri-linear interpolation, geometric interpolation, prism interpolation, pyramid interpolation, and tetrahedral interpolation.

In the embodiment of the present invention depicted in FIG. 7, the only points that are actually measured in this embodiment are the vertices 702 of a series of cubes 704. The cubes 704 are arranged along the gray diagonal of the cubic color output space 700, between the origin (0,0,0) and the opposite vertex (255,255,255). (For clarity of illustration, the gray diagonal is not depicted in FIG. 7, but is the same as the gray diagonal 1004 in FIG. 10. Similarly, the cubes 704 are depicted as generally solid for easier 3-dimensional illustration. Consequently, the rear-most vertices are not shown. However, it will be understood that the rear-most vertices are present and form color response measurement value points as well.)

The sizes of the cubes 704 may be selected in a number of ways, such as 16 cubes with sides of 16 each. However, in this embodiment the cubes 704 are dimensioned with sides of 17 each. Having sides of 17 results in a reduction in the number of the cubes 704 to 15 cubes along the gray diagonal. This accordingly reduces the number of points (the vertices of the cubes 704) that are measured.

A further reduction in the number of measurement points is made by connecting the cubes 704 in a diagonal series so that they share common vertices with those cubes 704 that are immediately adjacent. Then, each of the cubes 704 shares a common vertex with the preceding and succeeding cubes 704 as they traverse the diagonal in the cubic color output space 700 that contains the gray values. The total number of vertices of the cubes 704 is thereby reduced to 106.

Accordingly, only 106 measurement values are made for determining the gray values of the cubic color output space 700, the measurements being taken at the vertices 702 of the cubes 704. Additionally, the values of the three RGB chromaticities of (255,0,0), (0,255,0), and (0,0,255) are added in this embodiment of the present invention, giving a total of 109 values that then specify the profile of the display, including chromaticities, gray tracking, and gamma correction. The gray tracking that is thus specified also enables substantially constant chromaticities at all gray luminance levels.

A set of corresponding values 406 (FIG. 4) is then built from the measured color response values that have been measured at the vertices 702 of the cubes 704 on the gray diagonal of the cubic color output space 700 of the display system 100. The set of corresponding values 406 is a combination of the measured color response values that have been measured at the vertices 702 and a set of derived intermediate values for selected additional points within the cubic color output space 700 that were not measured. The selection, choice, or designation of those additional points, and the size of the resulting set of corresponding values 406, will be chosen according to the particular application and needs at hand. It may be as large as every unmeasured point within the cubic color output space 700, or it may be a subset thereof. For example, in one embodiment, the set of corresponding values 406 is the set of values that contains the points in the cubic color output space 700 that produce or cause the display system 100 to display true or actual gray outputs for the range of the display from black to white. Thus, the set of corresponding values 406 may be built of only the derived values, if those encompass all the values of interest, or it may optionally include some or all of the measured color response values as well.

The intermediate values for the set of corresponding values 406 are calculated from the measured values at the vertices 702 to build the complete set of corresponding values 406 as if all these additional values had actually been measured. However, substantial time is saved because physical value measurements for intermediate values take more time than the time to compute the intermediate values.

One solution for efficiently computing the intermediate values for completing the set of corresponding values 406 is tetrahedral decomposition and interpolation utilizing the cubes 704.

Figure 8A:
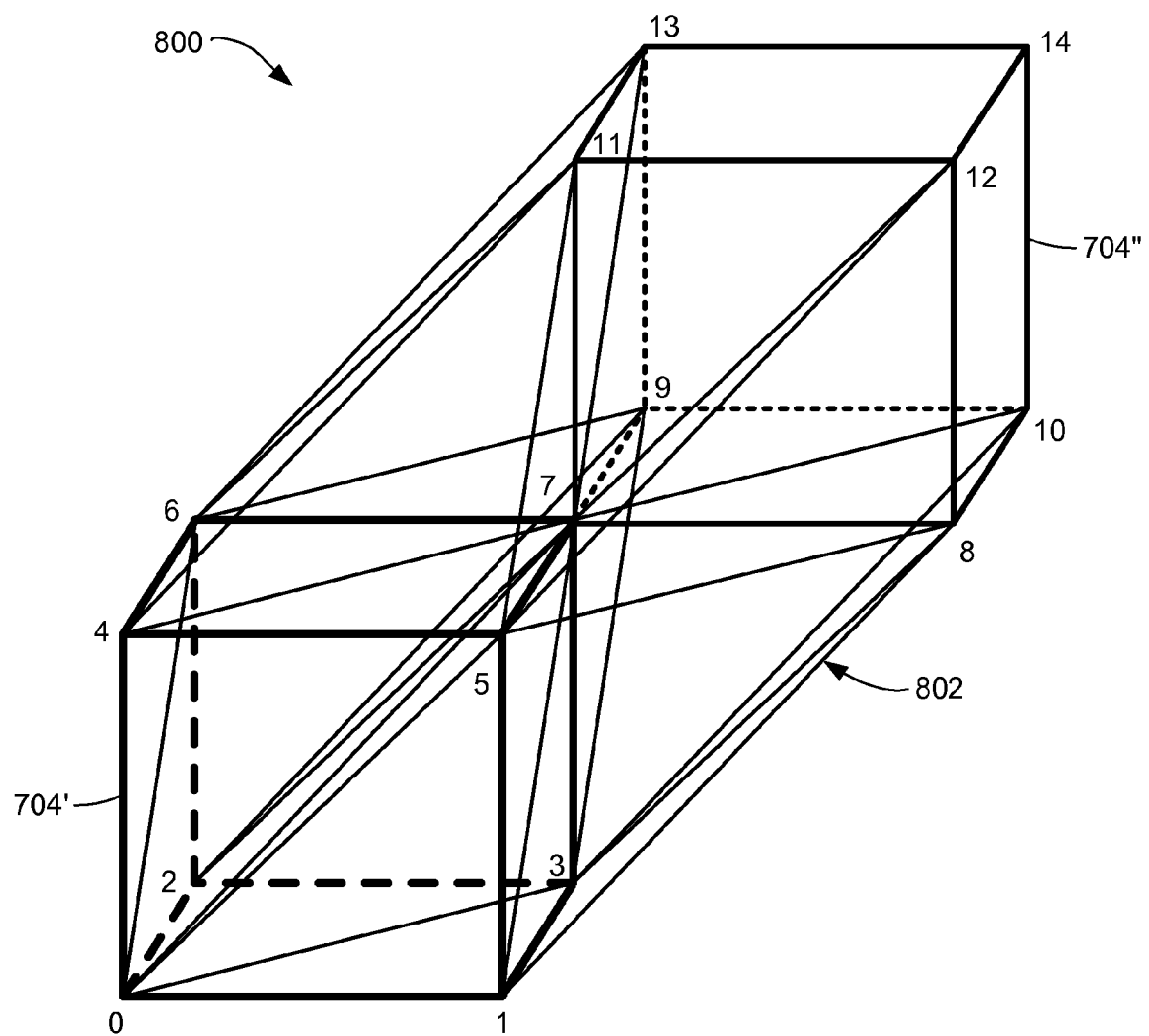
FIG. 8A is a depiction of a tetrahedral decomposition and interpolation according to an embodiment of the present invention.

Referring now to FIG. 8A, therein is depicted a tetrahedral decomposition and interpolation 800 that utilizes the cubes 704 according to an embodiment of the present invention. For clarity of illustration, FIG. 8A has been foreshortened along the Y-axis. Two contiguous cubes 704 are shown, a selected cube 704' and the next cube 704". The selected cube 704' and the next cube 704" have one vertex in common, denoted by the number 7. The volume of the space 802 between the selected cube 704' and the next cube 704" is the volume within and defined by the vertices of the selected cube 704' and the next cube 704" exclusive of the volumes of the selected cube 704' and the next cube 704".

Figure 8B:
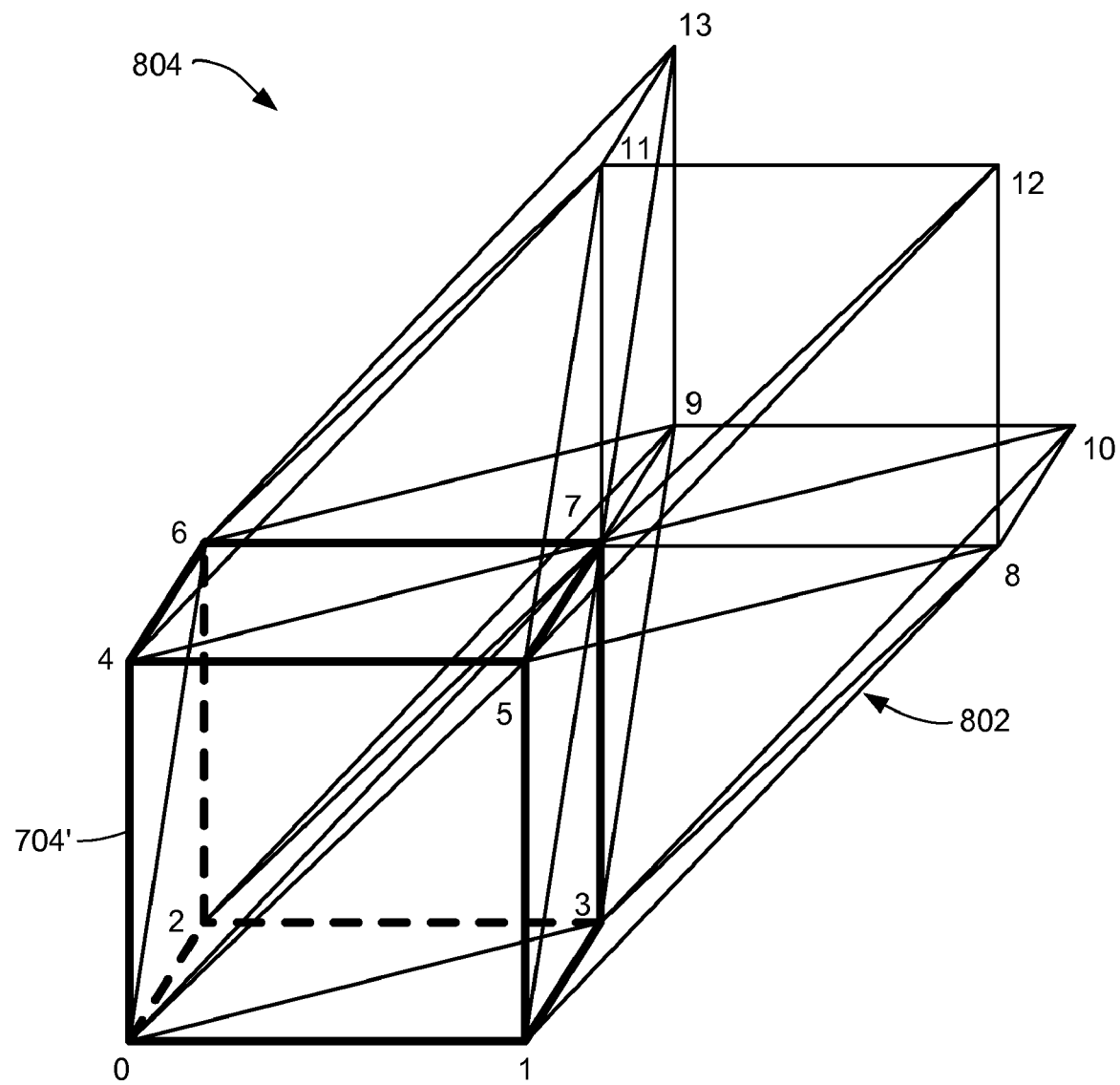
FIG. 8B is a view of an interpolation volume derived from the tetrahedral decomposition and interpolation depicted in FIG. 8A.

Referring now to FIG. 8B, therein is shown an interpolation volume 804 derived from the tetrahedral decomposition and interpolation 800 depicted in FIG. 8A. The interpolation volume 804 is the volume from the tetrahedral decomposition and interpolation 800 upon which the tetrahedral decomposition is performed according to an embodiment of the present invention. It has been unexpectedly discovered that the interpolation volume 804 can be advantageously employed to perform a more powerful and efficacious tetrahedral interpolation by utilizing not just the volumes of cubic sub-volumes (the cubes 704 (FIG. 7)) within the cubic color output space 700 (FIG. 7), but by including the intermediate volumes of the spaces 802 between and defined by adjacent cubes 704.

Each interpolation volume 804 (FIG. 8B) as thus taught herein, in one embodiment, is the volume of the figure depicted in FIG. 8A minus the volume of the next cube 704" (FIG. 8A). That is, the interpolation volume 804 (FIG. 8B) is the volume of the selected cube 704' and the volume of the space 802, and does not include the volume of the next cube 704".

Generation of the set of corresponding values 406 (FIG. 4) is then carried out efficiently and expeditiously by the use of 18 unique tetrahedrons formed from the interpolation volume 804 as taught herein.

Figure 9A:
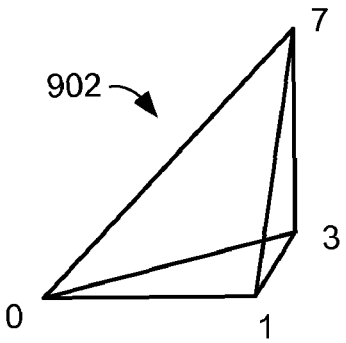
FIGS. 9A-9R are views of 18 unique tetrahedrons formed from the interpolation volume of FIG. 8B.
Figure 9B:
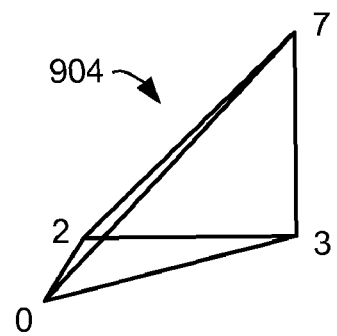
Figure 9C:
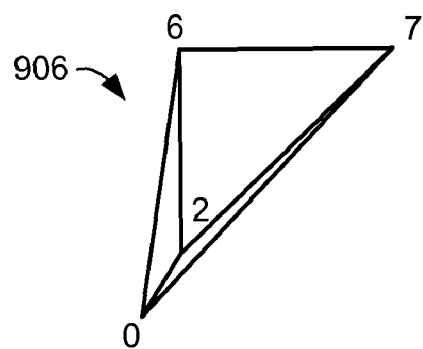
Figure 9D:
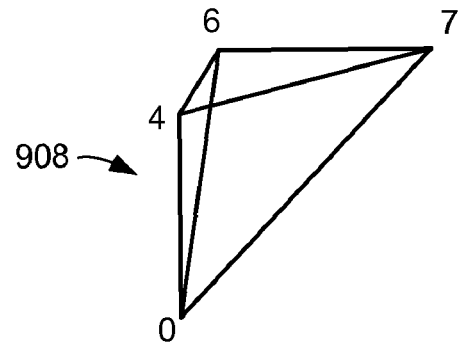
Figure 9E:
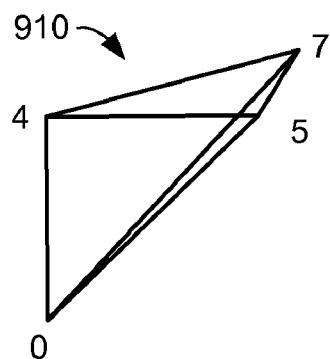
Figure 9F:
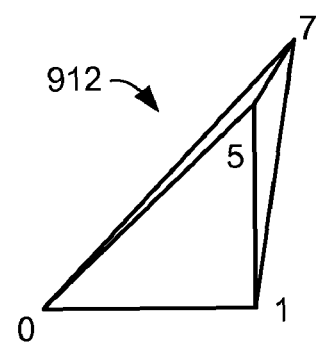
Figure 9G:
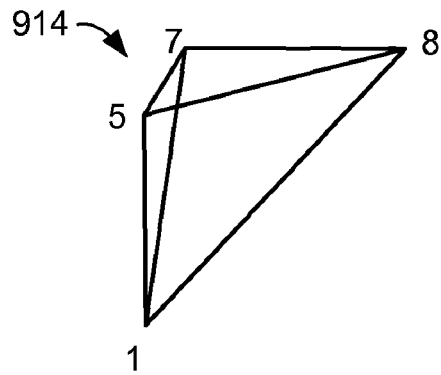
Figure 9H:
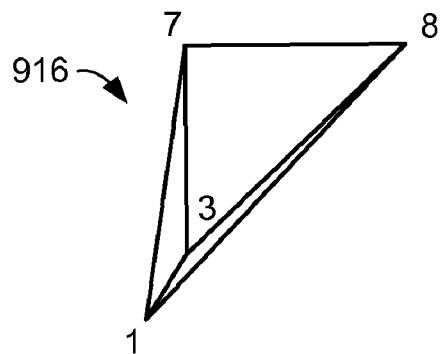
Figure 9I:
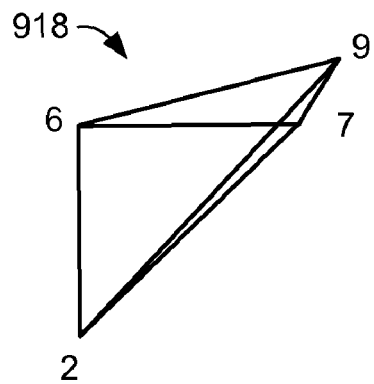
Figure 9J:
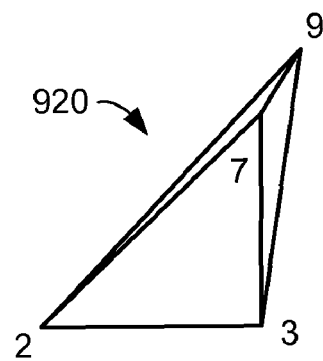
Figure 9K:
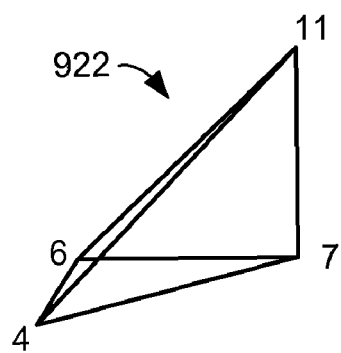
Figure 9L:
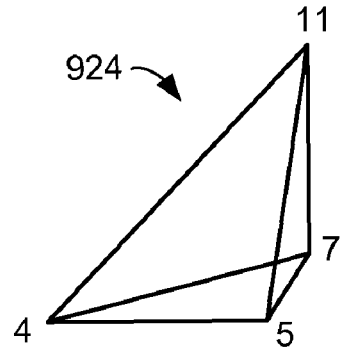
Figure 9M:
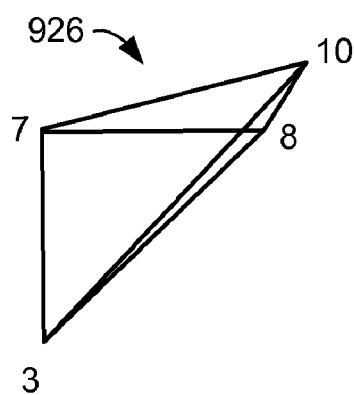
Figure 9N:
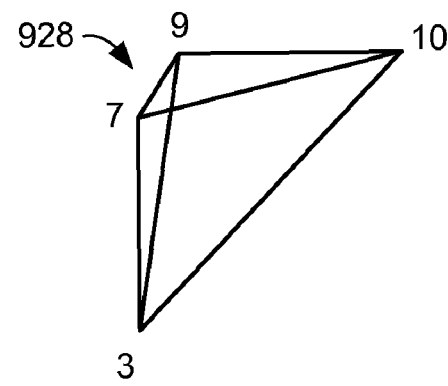
Figure 9O:
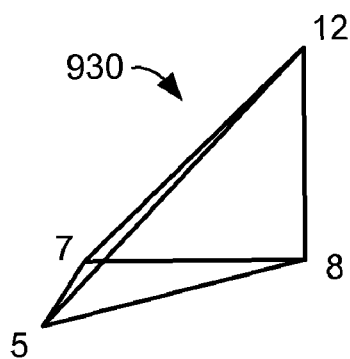
Figure 9P:
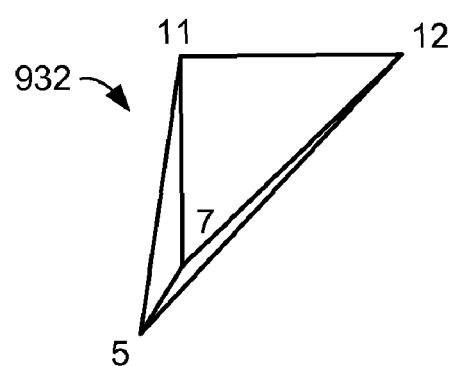
Figure 9Q:
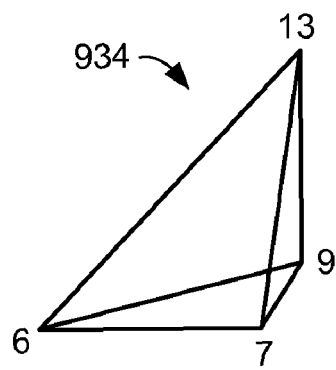
Figure 9R:
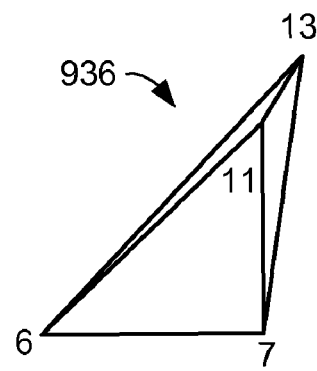

Referring now to FIGS. 9A-9R, therein are shown 18 unique tetrahedrons, respectively numbered 902, 904, 906, 908, 910, 912, 914, 916, 918, 920, 922, 924, 926, 928, 930, 932, 934, and 936, that are formed by tetrahedral decomposition of the interpolation volume 804 shown in FIG. 8B, according to an embodiment of the present invention. For ease of understanding, corresponding vertices in FIGS. 8 and 9 are each identified with the same numbers 0 through 14.

Using these 18 unique tetrahedrons, as identified and taught by the present invention, known tetrahedral interpolation techniques, as well as optional extensions thereof as taught herein, can be applied to the tetrahedrons to compute and derive the desired corresponding values 406 (FIG. 4).

In one embodiment, the set of corresponding values 406 is built by measuring the color response values of the display system 100 (FIG. 1) that go into the vertices 702 (FIG. 7) of sequential cubes 704 (FIG. 7) in the cubic color output space 700 (FIG. 7) of the display system 100, as described earlier. Next, intermediate values between the measured color response values are determined by tetrahedral decomposition and interpolation 800 of interpolation volumes 804 in the cubic color output space 700. Each of the interpolation volumes 804 is the combined volume of a selected cube 704' within the cubic color output space 700 and the volume of the space 802 between the selected cube 704' and the next cube 704" within the cubic color output space 700. The intermediate values are then combined with the measured color response values as desired to complete the set of corresponding values 406.

After the intermediate values have been determined and combined with the measured color response values to build the set of corresponding values 406, the set of corresponding values is then converted into RGB adjustment values, as shown in the block 408 (FIG. 4). The RGB adjustment values specify the RGB signals for the display system 100 to use to produce corrected colors. The RGB adjustment values may then be saved into one or more look-up tables, such as the LUT 306 (FIG. 3).

As an example, a particular color point may be selected for display. A procedure according to the present invention is then to find the unique tetrahedron that contains the particular selected color point. Having found that tetrahedron, then the RGB data, $a_j$, is found that was driving the display (or if an interpolated value, the data that would have been driving the display for that point) to produce the particular RGB values of the selected color point. The same $a_j$ is then used to identify the three corresponding red, green, and blue adjustment values in the LUT 306 to drive the display to produce the corresponding corrected color.

In determining these values and performing the tetrahedral decomposition, the four points of the tetrahedron may be considered to define respective proportional weights for the tetrahedron between 0 and 1. For a color point within the tetrahedron, all the weights will therefore fall between the values of 0 and 1. On the other hand, when defining the measured color response values in relation to a tetrahedron, when the measured color response value is outside that tetrahedron, the measured color response value is then expressed as a function of the four vertices of the tetrahedron having at least one weight that is less than 0 or greater than 1. In this way, according to the present invention, any value anywhere in the cubic color output space 700 can be determined from any tetrahedral decomposition volume, whether the point is inside or outside of the particular tetrahedral decomposition volume.

Further, to obtain the most accurate interpolated values, it is desirable to select from the set of tetrahedral decomposition tetrahedrons (e.g., those depicted in FIGS. 9A-9R), the tetrahedron that has the minimum sum of the absolute weights for the particular color response value. This is true as well for points that are outside of the particular tetrahedral decomposition volume as for those inside it.

Figure 10:
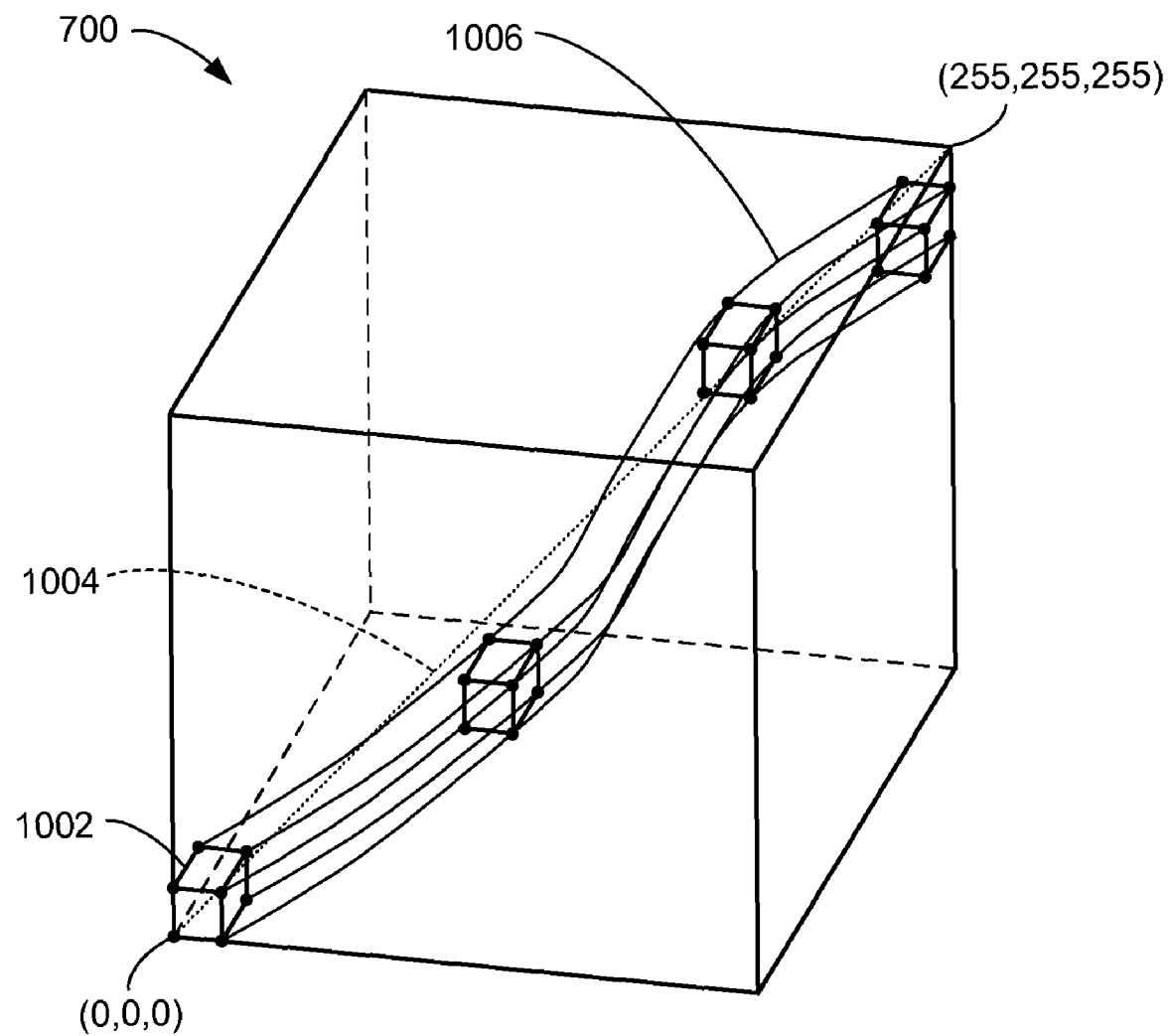
FIG. 10 is a view of the cubic color output space of FIG. 7 in another embodiment according to the present invention in which the tetrahedral decomposition cubes are not constrained to follow the gray diagonal of the cubic color output space.

Referring now to FIG. 10, therein is shown the cubic color output space 700 having therein cubes 1002 for the tetrahedral decomposition that are not constrained to follow the gray diagonal 1004 of the cubic color output space 700 (unlike the cubes 704 in FIG. 7). Instead, the cubes 1002 are built as a set of the particular cubes that display actual gray on the display system 100 (FIG. 1). The cubes 1002 are thus built by sequentially following the direction that the correct gray points take in each cube 1002 in succession, from the origin, and building successive cubes 1002 from those successive correct or true gray points to construct a series of cubes 1002 that follow the actual gray points. In other words, as each cube 1002 is measured, the gray value corrections that are determined at those points are then used to specify a correction or offset for the next cube 1002 that is to be built next, so that the succession of the cubes 1002 follows the true gray of the actual physical display system 100.

Expressed another way, the color response values are measured starting at the origin (0,0,0) of the cubic color output space 700 and building a set of cubes 1002 that give the actual gray and which may not all be on the gray diagonal 1004 of the cubic color output space 700. The direction that the correct gray points take is then followed, and incremental measurements are made from each of those correct gray points, rather than doing absolute measurements on a predetermined diagonal. The interpolation is thus done from cumulative experience in order to construct a path for the cubes 1002 that may be serpentine but that follows the points of ideal gray. The initial assumption is that the starting point (0,0,0) (which is black) is true gray.

In this way, the cubes 1002 track the actual gray values more accurately, and thereby require overall less correction (i.e. smaller RGB adjustment values), for greater precision. This is feasible, as unexpectedly discovered, because the underlying physical system in the display system 100 is a continuous system having effectively no discontinuities. Therefore, the adjustments for the cubes 1002 form a smooth and continuous series of adjustment offsets. This is depicted in FIG. 10 by a serpentine path 1006 that depicts the path of the series of the cubes 1002 through the cubic color output space 700. (Since the offsets may be cumulative, as illustrated, the serpentine path 1006 may not terminate at the maximum point (255,255,255)).

As can also be seen in FIG. 10, the various cubes, such as the cubes 1002, the cubes 704 in FIG. 7, and so forth, do not necessarily need to be contiguous, but may be spaced from each other depending upon the measurement pattern that is selected.

Figure 11:
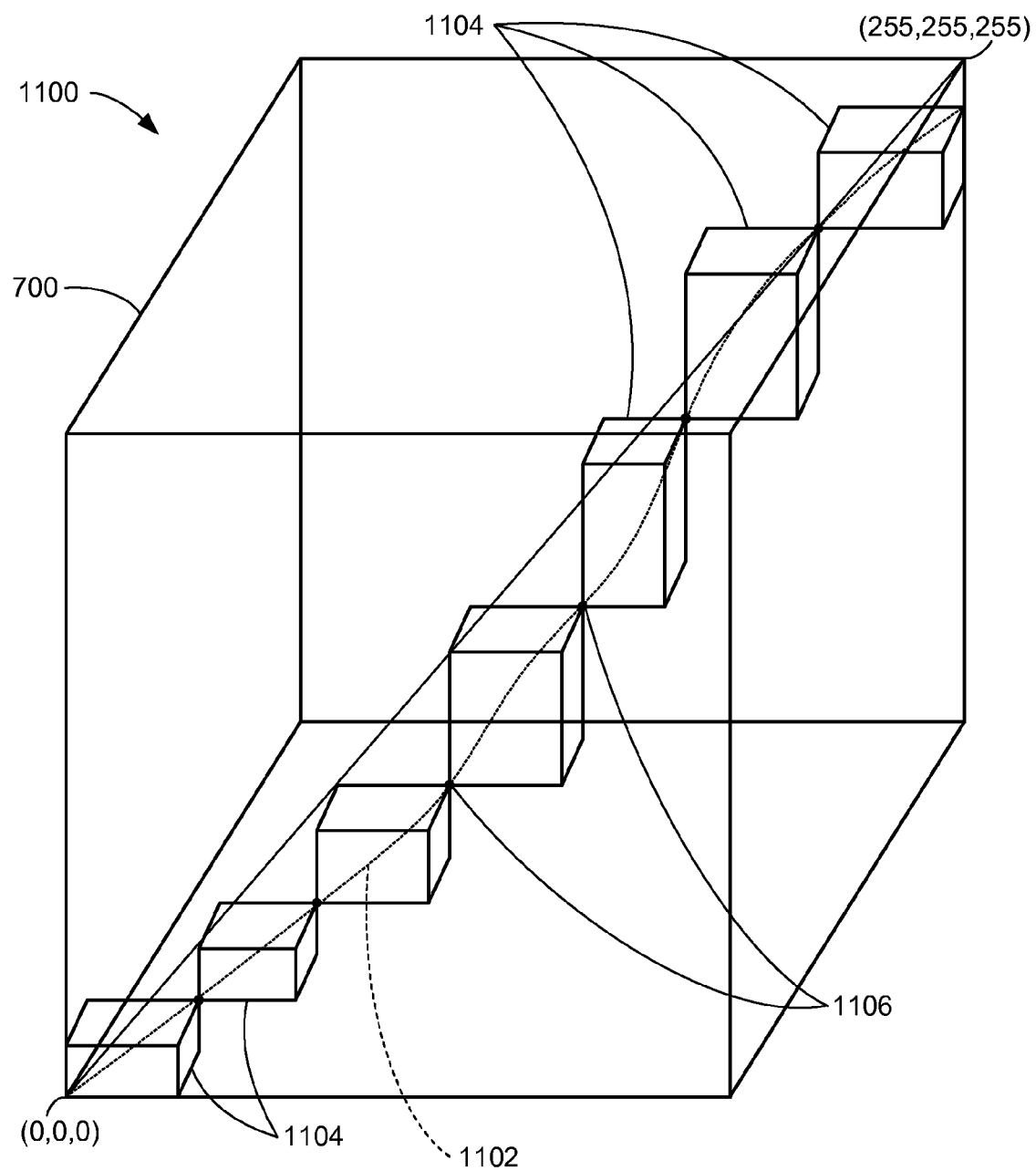
FIG. 11 is a view of a more generalized embodiment in which dissimilar cuboids are constructed along an actual gray line that meanders through the cubic color output space.

Referring now to FIG. 11, therein is shown a more generalized embodiment 1100 in which an actual gray line 1102 meanders on a serpentine path through the cubic color output space 700. The tetrahedral decomposition is then based upon polyhedra shaped as cuboids 1104 that are constructed along the actual gray line 1102. (A "cuboid" is a solid figure that has six rectangular faces at right angles to each other. A cube is a special case of a cuboid.) The cuboids 1104 have individual shapes and volumes that may be dissimilar, and may be selected, constructed, and customized as desired for the particular display color-correcting system analysis at hand.

In embodiment 1100, the cuboids 1104 have been selected and dimensioned to connect by common vertices 1106, similarly as the cubes 704 (FIG. 7) connect. The cuboids 1104 have also been selected and dimensioned to locate their common vertices 1106 on the actual gray line 1102. This beneficially enhances the accuracy of the tetrahedral decomposition analysis by placing the actual gray line 1102 within the interpolation volumes of the cuboids 1104.

In situations where the geometry and path of the actual gray line 1102 are not initially known, the actual gray line 1102 and the cuboids 1104 can be constructed together incrementally. For example, the first cuboids can be arbitrarily configured and then used to determine the actual path of the actual gray line 1102 through their volumes. The first cuboids can then be reconfigured and reshaped to position their common vertices 1106 on the actual gray line 1102. If desired, a new path for the actual gray line can then be calculated using the newer, more accurate cuboids, and the common vertices 1106 again repositioned on the new more accurate path of the actual gray line 1102. Then the next cuboid can be constructed around the actual gray line that is projected by the analysis from the first cuboids. Recalculations can again be conducted as desired, and then the next cuboid constructed. And so forth until the entire actual gray line has been generated and enclosed by the cuboids 1104, spanning the cubic color output space 700. In this way, starting substantially at the origin of the cubic color output space, a set of cuboids is built that give actual gray on the display by sequentially following the direction that the correct gray points take in each cuboid in succession from the origin and building successive cuboids from those correct gray points to construct a series of cuboids that follow the actual gray points.

Figure 12A:
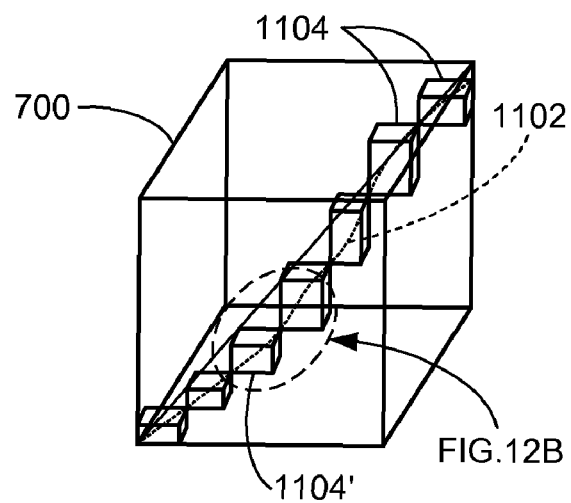
FIGS. 12A and 12B are views of an interpolation volume for one of the cuboids.
Figure 12B:
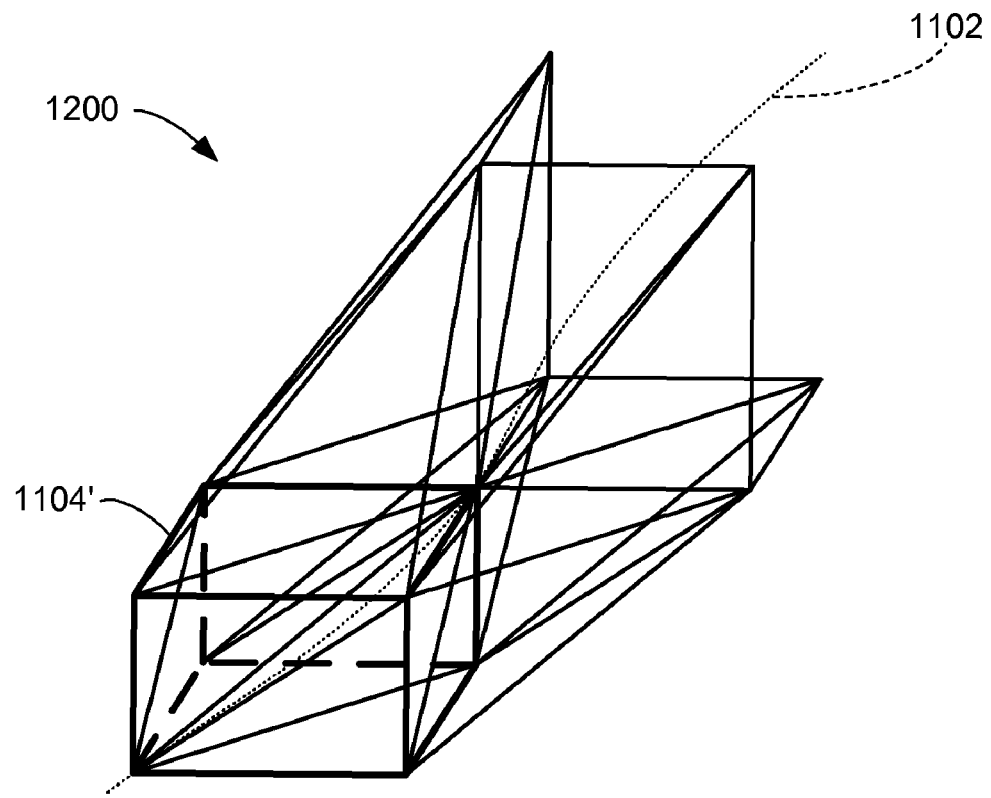

Referring now to FIGS. 12A and 12B, therein is shown an interpolation volume 1200 for one of the cuboids 1104, identified as cuboid 1104'.

Figure 13A:
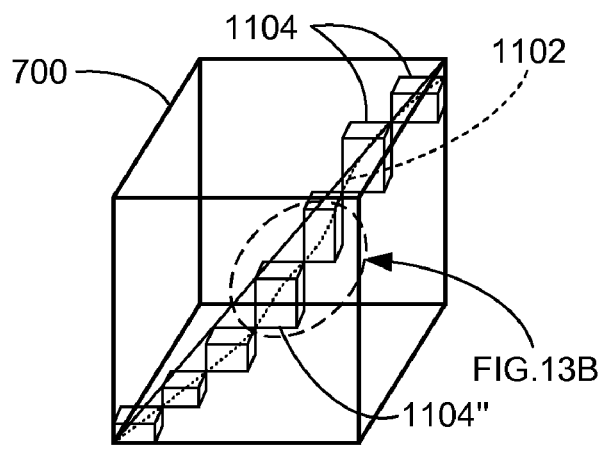
FIGS. 13A and 13B are views of an interpolation volume for another of the cuboids.
Figure 13B:
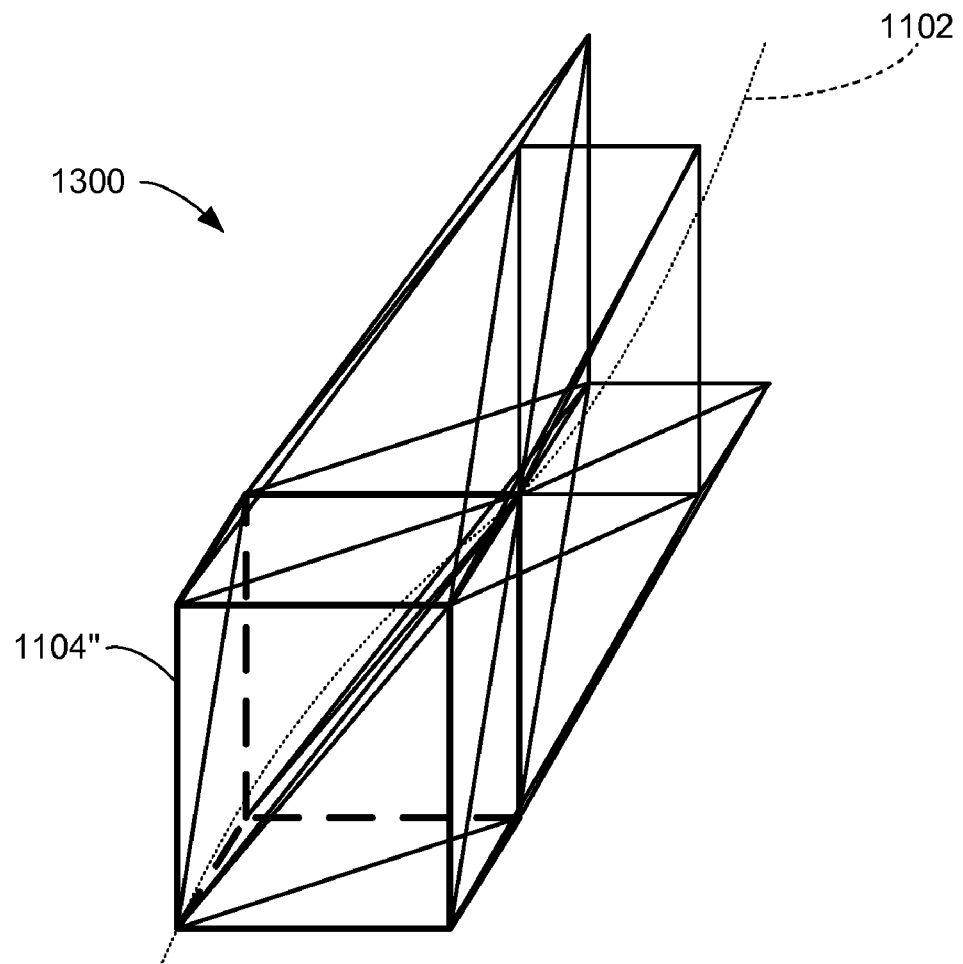

Referring now to FIGS. 13A and 13B, therein is similarly shown an interpolation volume 1300 for another of the cuboids 1104, identified as cuboid 1104".

Referring overall to the present invention, it will be understood that, although the CPU 304 has been described as performing many of the analytical, generation, computational, and control functions described in the present disclosure, the CPU is not the only circuitry herein that can be utilized for these purposes. Thus, circuitry for controlling the measuring of values, for building and converting sets of values, for finding, for decomposing, for interpolating, for specifying, for combining, for expressing, for saving values, for outputting values, and so forth, may be incorporated in and provided by the CPU 304 and its customary peripherals (not shown). Alternatively, or in addition, some of the circuitry for these and other functions may be provided by and incorporated in the measurement unit 302 or in the display system 100, for example, or in other circuitry components as appropriate or desired.

Figure 14:
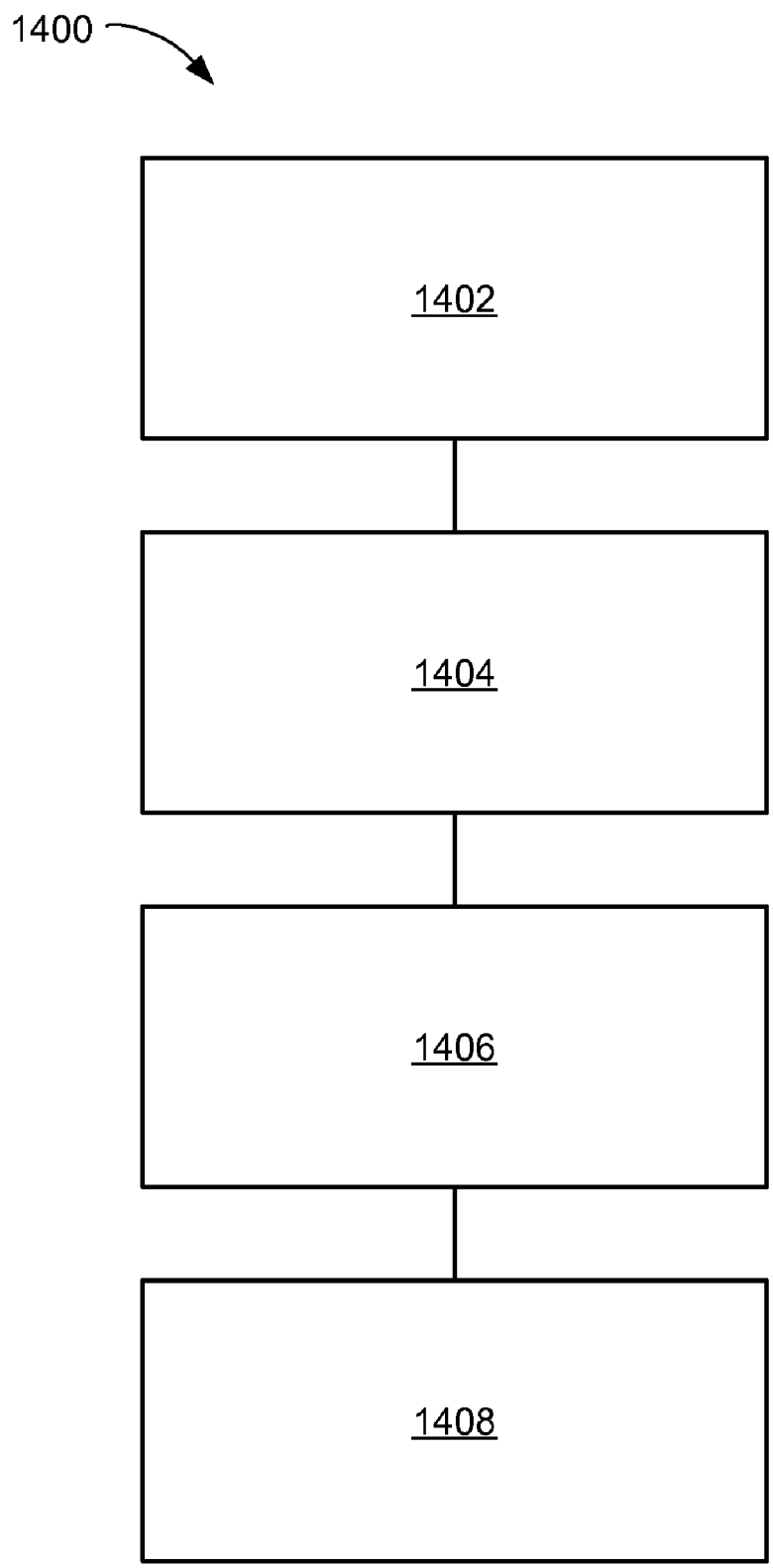
FIG. 14 is a flow chart of a display color-correcting system in an embodiment of the present invention.

Referring now to FIG. 14, therein is shown a flow chart of a display color-correcting system 1400 in an embodiment of the present invention. The system 1400 includes measuring the color response values that go into the vertices of polyhedra in a cubic color output space of the display in a block 1402; building a set of corresponding values for the display from intermediate values determined between the measured color response values by decomposition and interpolation of interpolation volumes in the cubic color output space, each of the interpolation volumes being the combined volume of a selected polyhedron within the cubic color output space and a predetermined volume of space between the selected polyhedron and the next polyhedron within the cubic color output space, in a block 1404; converting the set of corresponding values into decoupled RGB adjustment values that specify the RGB signals independently for the display to produce corrected colors in a block 1406; and saving the RGB adjustment values into one or more look-up tables in a block 1408.

In cases when the idiosyncratic response of the display shows significant discrepancies between channels, it may happen that the color correction for correct grays will "drag" the interpolation procedure outside of the tetrahedrons associated with the diagonal arrangement of cubes as explained in connection with FIG. 7. For those cases, the procedure according to the present invention can run in different ways.

In one embodiment, a small set of points, $N_1=3\times3\times3=27$ points can be first measured. Then using known techniques, a true gray tracking correction is derived consisting of 16 points $P_0, P_1, P_2, \ldots, P_{15}$. Pairs of adjacent points will become the diagonal corners of cuboids which will cover the space between the (0,0,0) and (255,255,255) corners of the XYZ space. The dimensions of each cuboid will be determined by the differences in each direction between adjacent point pairs $P_j, P_{j+1}, j=0, \ldots, 14$. With this structure, the likelihood of containing the true gray tracking points within the new tetrahedron structure is very much increased. Even if the tetrahedral interpolation results in no tetrahedron containing a target point during the interpolation, the interpolation procedure can pick up the tetrahedron at a closest distance to the target point. For this tetrahedron the interpolating weights that are characteristic to the tetrahedral interpolation will still result in negative values but the interpolation procedure will still produce correct results.

In another embodiment, only the measurements 0~13 are taken and then the interpolation procedure runs until the gray tracking is no longer found in the set of 18 tetrahedrons. At that point, a new set of measurements with the structure 0~13 is taken and the interpolation procedure is repeated until the gray tracking points are no longer found in the set of 18 tetrahedrons. This dynamic procedure ensures that the structure of 18 tetrahedrons always follows the calibration curve, no matter how asymmetric the idiosyncratic curves of the uncorrected display may be. FIGS. 11-13 illustrate this implementation for a set of seven cuboids spanning the cubic color output space 700.

It has been discovered that the present invention thus has numerous aspects.

One important aspect is that the measurement points in the cubic color output space 700 can be on the vertices of polyhedra other than cubes (e.g., hexahedrons, cuboids, etc.) according to the interpolation methodologies that are employed.

Another aspect is that the values that are saved into the look-up tables can be tailored, for example, to individual, regional, or cultural preferences, based on their preferences for what they perceive as a "true" gray. Many of these preferences may depend on the viewing condition in which the display is observed, the adaptation of the human visual system to the viewing conditions, or to the presence of another stimulus that is perceived as gray.

Another important aspect is that the size of the measurement set and the accuracy of the RGB adjustment values can be readily chosen and configured, according to the particular display system configuration at hand, to provide the desired degree of accuracy with the minimum number of physical measurements followed by rapid and efficient interpolation of the desired intermediate values.

A significant aspect of the present invention is that it provides greatly improved display color-correcting systems, and especially for improved gray tracking with efficient, effective, and economical reduced measurement sets.

Another important aspect that has been discovered is that the present invention unexpectedly provides better and more efficient display device calibration systems with virtually undiminished color quality and accuracy for easily, quickly, efficiently, and economically calibrating large numbers of display devices, such as in high-speed, volume-manufacturing environments.

Another aspect is that the present invention provides an excellent, consistent, and affordable consumer experience by enabling the efficient, high-speed manufacture of LED-illuminated larger-sized displays that are easy and inexpensive to manufacture and low in cost, and quickly and accurately calibrated with uniform color performance characteristics.

An important aspect is thus that the present invention significantly facilitates the replacement of CCFL light sources with LED light sources in commercial consumer applications.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the display color-correcting system of the present invention furnishes important and heretofore unknown and unavailable solutions, capabilities, and functional aspects for color correcting a display for color and/or gray tracking with reduced measurement sets. The resulting processes and configurations are straightforward, cost-effective, uncomplicated, highly versatile and effective, can be surprisingly and unobviously implemented by adapting known technologies, and are thus readily suited for efficiently and economically manufacturing economical, high quality display devices.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A display color-correcting method, comprising:
measuring the color response values that go into the vertices of polyhedra in a cubic color output space of the display;
building a set of corresponding values for the display from intermediate values determined between the measured color response values by decomposition and interpolation of interpolation volumes in the cubic color output space, each of the interpolation volumes being the combined volume of a selected polyhedron within the cubic color output space and a predetermined volume of space between the selected polyhedron and the next polyhedron within the cubic color output space;
converting the set of corresponding values into decoupled RGB adjustment values that specify the RGB signals independently for the display to produce corrected colors; and
saving the RGB adjustment values into one or more look-up tables.

2. The method as claimed in claim 1 wherein the polyhedra further comprise cuboids.

3. The method as claimed in claim 1 wherein the polyhedra further comprise cubes.

4. The method as claimed in claim 1 wherein the polyhedra further comprise polyhedra located substantially on a gray diagonal in the cubic color output space of the display.

5. The method as claimed in claim 1 wherein the decomposition further comprises tetrahedral decomposition.

6. The method as claimed in claim 1 wherein building a set of corresponding values further comprises combining the intermediate values with at least one of the measured color response values.

7. The method as claimed in claim 1 further comprising reducing the measurements per polyhedron by sharing common vertices with adjacent polyhedra.

8. The method as claimed in claim 1 further comprising measuring the response of the display for values that correspond to the polyhedra along the diagonal from (0,0,0) to (255,255,255) in a $256^3$ dimensioned color space to provide gray tracking to enable substantially constant chromaticities at all gray luminance levels.

9. The method as claimed in claim 1 wherein the predetermined volume of space between the selected polyhedron and the next polyhedron is the volume within and defined by the vertices of the selected polyhedron and the next polyhedron exclusive of the volumes of the selected polyhedron and the next polyhedron.

10. The method as claimed in claim 1 wherein:
the predetermined volume of space between the selected polyhedron and the next polyhedron is the volume within and defined by the vertices of the selected polyhedron and the next polyhedron exclusive of the volumes of the selected polyhedron and the next polyhedron; and
the selected and next polyhedra have one vertex in common.

11. The method as claimed in claim 1 wherein the measured color response values are uncorrected RGB output data for the display.

12. The method as claimed in claim 1:
wherein the measured color response values are uncorrected RGB output data for the display; and
further comprising outputting the measured color response values of the RGB data for the display as $(L^*,a^*,b^*)_i$ for each set of $(R,G,B)_i$.

13. The method as claimed in claim 1 further comprising:
finding the unique tetrahedron that contains a particular color point selected for display;
then finding the RGB data, $a_j$, in the look-up table that was driving the display to produce the particular RGB values of the selected color point; and
then using the same $a_j$ to identify the three corresponding red, green, and blue values in the look-up table to drive the display to produce the corresponding corrected color.

14. The method as claimed in claim 1 wherein at least one look-up table is stored in the display.

15. The method as claimed in claim 1 wherein at least one look-up table is stored externally to the display.

16. The method as claimed in claim 1 wherein at least one look-up table is stored in a computer.

17. The method as claimed in claim 1 wherein the cubic color output space is a $256^3$ dimensional color space, and the polyhedra therein are sequential $17^3$ dimensional cubes.

18. The method as claimed in claim 1 further comprising adding the values of the three RGB chromaticities of (255,0,0), (0,255,0), and (0,0,255) to the set of corresponding values.

19. The method as claimed in claim 1 further comprising tailoring the values saved into at least one of the look-up tables.

20. The method as claimed in claim 1 wherein measuring the color response values further comprises starting substantially at the origin of the cubic color output space and building a set of polyhedra that give actual gray on the display by sequentially following the direction that the correct gray points take in each polyhedron in succession from the origin and building successive polyhedra from those correct gray points to construct a series of polyhedra that follow the actual gray points.

21. A display color-correcting method, comprising:
measuring the color response values that go into the vertices of sequential cubes in a cubic color output space of a display;
building a set of corresponding values for the display by determining intermediate values between the measured color response values by tetrahedral decomposition and interpolation of interpolation volumes in the cubic color output space, each of the interpolation volumes being the combined volume of a selected cube within the cubic color output space and a predetermined volume of space between the selected cube and the next cube within the cubic color output space;
converting the set of corresponding values into RGB adjustment values that specify the RGB signals for the display to produce corrected colors; and
saving the RGB adjustment values into one or more look-up tables.

22. The method as claimed in claim 21 wherein building a set of corresponding values further comprises combining the intermediate values with at least one of the measured color response values.

23. The method as claimed in claim 21 further comprising reducing the measurements per cube by sharing common vertices with diagonal cubes.

24. The method as claimed in claim 21 wherein the cubes are located sequentially along a diagonal in the cubic color output space of the display.

25. The method as claimed in claim 21 wherein the cubes are located along the gray diagonal in the cubic color output space of the display.

26. The method as claimed in claim 21 further comprising measuring the response of the display for values that correspond to the cubes along the diagonal from (0,0,0) to (255,255,255) in a $256^3$ dimensioned color space to provide gray tracking to enable substantially constant chromaticities at all gray luminance levels.

27. The method as claimed in claim 21 wherein the predetermined volume of space between the selected cube and the next cube is the volume within and defined by the vertices of the selected cube and the next cube exclusive of the volumes of the selected cube and the next cube.

28. The method as claimed in claim 21 wherein:
the predetermined volume of space between the selected cube and the next cube is the volume within and defined by the vertices of the selected cube and the next cube exclusive of the volumes of the selected cube and the next cube; and
the selected and next cubes have one vertex in common.

29. The method as claimed in claim 21 wherein the measured color response values are uncorrected RGB output data for the display.

30. The method as claimed in claim 21:
wherein the measured color response values are uncorrected RGB output data for the display; and
further comprising outputting the measured color response values of the RGB data for the display as $(L^*,a^*,b^*)_i$ for each set of $(R,G,B)_i$.

31. The method as claimed in claim 21 further comprising:
finding the unique tetrahedron that contains a particular color point selected for display;
then finding the RGB data, $a_j$, in the look-up table that was driving the display to produce the particular RGB values of the selected color point; and
then using the same $a_j$ to identify the three corresponding red, green, and blue values in the look-up table to drive the display to produce the corresponding corrected color.

32. The method as claimed in claim 21 wherein at least one look-up table is stored in the display.

33. The method as claimed in claim 21 wherein at least one look-up table is stored externally to the display.

34. The method as claimed in claim 21 wherein at least one look-up table is stored in a computer.

35. The method as claimed in claim 21 wherein the cubic color output space is a $256^3$ dimensioned color space, and the cubes therein are sequential $17^3$ dimensioned cubes, totaling altogether 15 cubes in the cubic color output space.

36. The method as claimed in claim 21 further comprising adding the values of the three RGB chromaticities of (255,0,0), (0,255,0), and (0,0,255) to the set of corresponding values.

37. The method as claimed in claim 21:
wherein there are 15 cubes, each sharing a common vertex each with the preceding and succeeding cubes, the 15 cubes traversing a diagonal in the cubic color output space that contains the gray values; and
further comprising:

measuring values at the vertices of the 15 cubes to generate 106 measurement values for the set of corresponding values;

adding the values of the three RGB chromaticities of (255,0,0), (0,255,0), and (0,0,255) to the set of corresponding values; and specifying from the 109 values the profile of the display, including chromaticities, gray tracking, and gamma correction.

38. The method as claimed in claim 21 further comprising tailoring the values saved into the look-up tables to a predetermined individual, predetermined regional, or predetermined cultural preference.

39. The method as claimed in claim 21 wherein, in the tetrahedral decomposition, the four points of a tetrahedron define respective proportional weights for the tetrahedron between 0 and 1.

40. The method as claimed in claim 21 further comprising defining the measured color response values in relation to a tetrahedron and, when the measured color response value is outside that tetrahedron, expressing the measured color response value as a function of the four vertices of the tetrahedron having at least one weight that is less than zero or greater than one.

41. The method as claimed in claim 21:
wherein, in the tetrahedral decomposition, the four points of a tetrahedron define respective proportional weights for the tetrahedron between 0 and 1; and
further comprising:
defining the measured color response values in relation to a tetrahedron; and
when the measured color response value is outside that tetrahedron, expressing the measured color response value as a function of the four vertices of the tetrahedron having at least one weight that is less than zero or greater than one.

42. The method as claimed in claim 21:
wherein, in the tetrahedral decomposition, the four points of a tetrahedron define respective proportional weights for the tetrahedron between 0 and 1; and
further comprising:
defining the measured color response values in relation to a tetrahedron; and
when the measured color response value is outside that tetrahedron:
expressing the measured color response value as a function of the four vertices of the tetrahedron having at least one weight that is less than zero or greater than one; and
selecting, from the set of tetrahedral decomposition tetrahedrons, a tetrahedron that has the minimum sum of the absolute weights.

43. The method as claimed in claim 21 wherein measuring the color response values further comprises starting substantially at the origin of the cubic color output space and building a set of cubes that give actual gray on the display by sequentially following the direction that the correct gray points take in each cube in succession from the origin and building successive cubes from those correct gray points to construct a series of cubes that follow the actual gray points.

44. A display color-correcting system, comprising:
means for measuring the color response values that go into the vertices of polyhedra in a cubic color output space of the display;
circuitry for building a set of corresponding values for the display from intermediate values determined between the measured color response values by decomposition and interpolation of interpolation volumes in the cubic color output space, each of the interpolation volumes being the combined volume of a selected polyhedron within the cubic color output space and a predetermined volume of space between the selected polyhedron and the next polyhedron within the cubic color output space;
circuitry for converting the set of corresponding values into decoupled RGB adjustment values that specify the RGB signals independently for the display to produce corrected colors; and
means for saving the RGB adjustment values into one or more look-up tables.

45. The system as claimed in claim 44 wherein the polyhedra further comprise cuboids.

46. The system as claimed in claim 44 wherein the polyhedra further comprise cubes.

47. The system as claimed in claim 44 wherein the polyhedra further comprise polyhedra located substantially on a gray diagonal in the cubic color output space of the display.

48. The system as claimed in claim 44 wherein the decomposition further comprises tetrahedral decomposition.

49. The system as claimed in claim 44 wherein the circuitry for building a set of corresponding values further comprises circuitry for combining the intermediate values with at least one of the measured color response values.

50. The system as claimed in claim 44 further comprising means for reducing the measurements per polyhedron by sharing common vertices with adjacent polyhedra.

51. The system as claimed in claim 44 further comprising means for measuring the response of the display for values that correspond to the polyhedra along the diagonal from (0,0,0) to (255,255,255) in a $256^3$ dimensioned color space to provide gray tracking to enable substantially constant chromaticities at all gray luminance levels.

52. The system as claimed in claim 44 wherein the predetermined volume of space between the selected polyhedron and the next polyhedron is the volume within and defined by the vertices of the selected polyhedron and the next polyhedron exclusive of the volumes of the selected polyhedron and the next polyhedron.

53. The system as claimed in claim 44 wherein:
the predetermined volume of space between the selected polyhedron and the next polyhedron is the volume within and defined by the vertices of the selected polyhedron and the next polyhedron exclusive of the volumes of the selected polyhedron and the next polyhedron; and
the selected and next polyhedra have one vertex in common.

54. The system as claimed in claim 44 wherein the measured color response values are uncorrected RGB output data for the display.

55. The system as claimed in claim 44:
wherein the measured color response values are uncorrected RGB output data for the display; and
further comprising means for outputting the measured color response values of the RGB data for the display as $(L^*,a^*,b^*)_i$ for each set of $(R,G,B)_i$.

56. The system as claimed in claim 44 further comprising:
means for finding the unique tetrahedron that contains a particular color point selected for display;
means for then finding the RGB data, $a_j$, in the look-up table that was driving the display to produce the particular RGB values of the selected color point; and means for then using the same $a_j$ to identify the three corresponding red, green, and blue values in the look-up table to drive the display to produce the corresponding corrected color.

57. The system as claimed in claim 44 wherein at least one look-up table is stored in the display.

58. The system as claimed in claim 44 wherein at least one look-up table is stored externally to the display.

59. The system as claimed in claim 44 wherein at least one look-up table is stored in a computer.

60. The system as claimed in claim 44 wherein the cubic color output space is a $256^3$ dimensioned color space, and the polyhedra therein are sequential $17^3$ dimensioned cubes.

61. The system as claimed in claim 44 further comprising means for adding the values of the three RGB chromaticities of (255,0,0), (0,255,0), and (0,0,255) to the set of corresponding values.

62. The system as claimed in claim 44 further comprising means for tailoring the values saved into at least one of the look-up tables.

63. The system as claimed in claim 44 wherein the means for measuring the color response values further comprises means for starting substantially at the origin of the cubic color output space and building a set of polyhedra that give actual gray on the display by sequentially following the direction that the correct gray points take in each polyhedron in succession from the origin and building successive polyhedra from those correct gray points to construct a series of polyhedra that follow the actual gray points.

64. A display color-correcting system, comprising:
means for measuring the color response values that go into the vertices of sequential cubes in a cubic color output space of a display;
circuitry for building a set of corresponding values for the display by determining intermediate values between the measured color response values by tetrahedral decomposition and interpolation of interpolation volumes in the cubic color output space, each of the interpolation volumes being the combined volume of a selected cube within the cubic color output space and a predetermined volume of space between the selected cube and the next cube within the cubic color output space;
circuitry for converting the set of corresponding values into RGB adjustment values that specify the RGB signals for the display to produce corrected colors; and
means for saving the RGB adjustment values into one or more look-up tables.

65. The system as claimed in claim 64 wherein the circuitry for building a set of corresponding values further comprises circuitry for combining the intermediate values with at least one of the measured color response values.

66. The system as claimed in claim 64 further comprising means for reducing the measurements per cube by sharing common vertices with diagonal cubes.

67. The system as claimed in claim 64 wherein the cubes are located sequentially along a diagonal in the cubic color output space of the display.

68. The system as claimed in claim 64 wherein the cubes are located along the gray diagonal in the cubic color output space of the display.

69. The system as claimed in claim 64 further comprising means for measuring the response of the display for values that correspond to the cubes along the diagonal from (0,0,0) to (255,255,255) in a $256^3$ dimensioned color space to provide gray tracking to enable substantially constant chromaticities at all gray luminance levels.

70. The system as claimed in claim 64 wherein the predetermined volume of space between the selected cube and the next cube is the volume within and defined by the vertices of the selected cube and the next cube exclusive of the volumes of the selected cube and the next cube.

71. The system as claimed in claim 64 wherein:
the predetermined volume of space between the selected cube and the next cube is the volume within and defined by the vertices of the selected cube and the next cube exclusive of the volumes of the selected cube and the next cube; and
the selected and next cubes have one vertex in common.

72. The system as claimed in claim 64 wherein the measured color response values are uncorrected RGB output data for the display.

73. The system as claimed in claim 64:
wherein the measured color response values are uncorrected RGB output data for the display; and
further comprising means for outputting the measured color response values of the RGB data for the display as $(L^*,a^*,b^*)_i$ for each set of $(R,G,B)_i$.

74. The system as claimed in claim 64 further comprising:
means for finding the unique tetrahedron that contains a particular color point selected for display;
means for then finding the RGB data, $a_j$, in the look-up table that was driving the display to produce the particular RGB values of the selected color point; and
means for then using the same $a_j$ to identify the three corresponding red, green, and blue values in the look-up table to drive the display to produce the corresponding corrected color.

75. The system as claimed in claim 64 wherein at least one look-up table is stored in the display.

76. The system as claimed in claim 64 wherein at least one look-up table is stored externally to the display.

77. The system as claimed in claim 64 wherein at least one look-up table is stored in a computer.

78. The system as claimed in claim 64 wherein the cubic color output space is a $256^3$ dimensioned color space, and the cubes therein are sequential $17^3$ dimensioned cubes, totaling altogether 15 cubes in the cubic color output space.

79. The system as claimed in claim 64 further comprising means for adding the values of the three RGB chromaticities of (255,0,0), (0,255,0), and (0,0,255) to the set of corresponding values.

80. The system as claimed in claim 64:
wherein there are 15 cubes, each sharing a common vertex each with the preceding and succeeding cubes, the 15 cubes traversing a diagonal in the cubic color output space that contains the gray values; and
further comprising means for:
measuring values at the vertices of the 15 cubes to generate 106 measurement values for the set of corresponding values;
adding the values of the three RGB chromaticities of (255,0,0), (0,255,0), and (0,0,255) to the set of corresponding values; and
specifying from the 109 values the profile of the display, including chromaticities, gray tracking, and gamma correction.

81. The system as claimed in claim 64 further comprising means for tailoring the values saved into the look-up tables to a predetermined individual, predetermined regional, or predetermined cultural preference.

82. The system as claimed in claim 64 wherein, in the tetrahedral decomposition, the four points of a tetrahedron define respective proportional weights for the tetrahedron between 0 and 1.

83. The system as claimed in claim 64 further comprising circuitry for defining the measured color response values in relation to a tetrahedron and, when the measured color response value is outside that tetrahedron, expressing the measured color response value as a function of the four vertices of the tetrahedron having at least one weight that is less than zero or greater than one.

84. The system as claimed in claim 64:
wherein, in the tetrahedral decomposition, the four points of a tetrahedron define respective proportional weights for the tetrahedron between 0 and 1; and
further comprising means for:
defining the measured color response values in relation to a tetrahedron; and
when the measured color response value is outside that tetrahedron, expressing the measured color response value as a function of the four vertices of the tetrahedron having at least one weight that is less than zero or greater than one.

85. The system as claimed in claim 64:
wherein, in the tetrahedral decomposition, the four points of a tetrahedron define respective proportional weights for the tetrahedron between 0 and 1; and
further comprising means for:
defining the measured color response values in relation to a tetrahedron; and
when the measured color response value is outside that tetrahedron:
expressing the measured color response value as a function of the four vertices of the tetrahedron having at least one weight that is less than zero or greater than one; and
selecting, from the set of tetrahedral decomposition tetrahedrons, a tetrahedron that has the minimum sum of the absolute weights.

86. The system as claimed in claim 64 wherein the means for measuring the color response values further comprises means for starting substantially at the origin of the cubic color output space and building a set of cubes that give actual gray on the display by sequentially following the direction that the correct gray points take in each cube in succession from the origin and building successive cubes from those correct gray points to construct a series of cubes that follow the actual gray points.

* * * * *

UNITED STATES PATENT AND TRADEMARK OFFICE
CERTIFICATE OF CORRECTION

| | | |
|---|---|---|
| PATENT NO. | : 7,777,760 B2 | Page 1 of 1 |
| APPLICATION NO. | : 11/771955 | |
| DATED | : August 17, 2010 | |
| INVENTOR(S) | : Gabriel G. Marcu et al. | |

It is certified that error appears in the above-identified patent and that said Letters Patent is hereby corrected as shown below:

In column 1, line 6, delete "color correcting" and insert -- color-correcting --, therefor.

In column 15, line 60, delete "color correcting" and insert -- color-correcting --, therefor.

Signed and Sealed this
Twenty-second Day of November, 2011

David J. Kappos
*Director of the United States Patent and Trademark Office*